United States Patent
Fermann

(10) Patent No.: US 10,096,962 B2
(45) Date of Patent: Oct. 9, 2018

(54) ALL-FIBER CHIRPED PULSE AMPLIFICATION SYSTEMS

(71) Applicant: IMRA AMERICA, INC., Ann Arbor, MI (US)

(72) Inventor: Martin E. Fermann, Dexter, MI (US)

(73) Assignee: IMRA AMERICA, INC., Ann Arbor, MI (US)

(*) Notice: Subject to any disclaimer, the term of this patent is extended or adjusted under 35 U.S.C. 154(b) by 395 days.

(21) Appl. No.: 14/716,369

(22) Filed: May 19, 2015

(65) Prior Publication Data

US 2015/0255942 A1    Sep. 10, 2015

Related U.S. Application Data

(60) Division of application No. 13/936,278, filed on Jul. 8, 2013, now Pat. No. 9,042,004, which is a division
(Continued)

(51) Int. Cl.
*H01S 3/00* (2006.01)
*H01S 3/13* (2006.01)
(Continued)

(52) U.S. Cl.
CPC .......... *H01S 3/0057* (2013.01); *H01S 3/0078* (2013.01); *H01S 3/06712* (2013.01);
(Continued)

(58) Field of Classification Search
CPC .. H01S 3/0057; H01S 3/0078; H01S 3/06712; H01S 3/06725; H01S 3/06754; H01S 3/06758
See application file for complete search history.

(56) References Cited

U.S. PATENT DOCUMENTS

| | | | |
|---|---|---|---|
| 4,815,079 A | 3/1989 | Snitzer et al. | |
| 5,303,314 A | 4/1994 | Duling | |

(Continued)

FOREIGN PATENT DOCUMENTS

| | | |
|---|---|---|
| DE | 10124983 A1 | 3/2002 |
| JP | 10073851 A | 3/1998 |

(Continued)

OTHER PUBLICATIONS

L. Kuznetsova, et al., interplay of nonlinearity and gain shaping in femtosecond fver amplifiers, Optics Letters, Sep. 1, 2006, pp. 2640-2642, vol. 31, No. 17.
(Continued)

*Primary Examiner* — Eric L Bolda
(74) *Attorney, Agent, or Firm* — Sughrue Mion, PLLC; Richard C. Turner

(57) ABSTRACT

By compensating polarization mode-dispersion as well chromatic dispersion in photonic crystal fiber pulse compressors, high pulse energies can be obtained from all-fiber chirped pulse amplification systems. By inducing third-order dispersion in fiber amplifiers via self-phase modulation, the third-order chromatic dispersion from bulk grating pulse compressors can be compensated and the pulse quality of hybrid fiber/bulk chirped pulse amplification systems can be improved. Finally, by amplifying positively chirped pulses in negative dispersion fiber amplifiers, a low noise wavelength tunable seed source via anti-Stokes frequency shifting can be obtained.

23 Claims, 22 Drawing Sheets

Related U.S. Application Data of application No. 12/851,315, filed on Aug. 5, 2010, now Pat. No. 8,503,069, which is a division of application No. 12/173,094, filed on Jul. 15, 2008, now Pat. No. 8,228,597, which is a division of application No. 10/992,762, filed on Nov. 22, 2004, now Pat. No. 7,414,780, which is a continuation-in-part of application No. 10/608,233, filed on Jun. 30, 2003, now Pat. No. 7,257,302.

(60) Provisional application No. 60/539,110, filed on Jan. 27, 2004, provisional application No. 60/474,999, filed on Jun. 3, 2003.

(51) Int. Cl.
*H01S 3/067* (2006.01)
*H01S 3/23* (2006.01)
*H01S 3/16* (2006.01)
*H01S 3/094* (2006.01)
*H01S 3/108* (2006.01)
*H01S 3/30* (2006.01)

(52) U.S. Cl.
CPC ...... *H01S 3/06725* (2013.01); *H01S 3/06754* (2013.01); *H01S 3/06758* (2013.01); *H01S 3/1301* (2013.01); *H01S 3/1608* (2013.01); *H01S 3/1618* (2013.01); *H01S 3/0064* (2013.01); *H01S 3/06741* (2013.01); *H01S 3/094007* (2013.01); *H01S 3/1086* (2013.01); *H01S 3/2308* (2013.01); *H01S 3/2316* (2013.01); *H01S 3/302* (2013.01)

(56) References Cited

U.S. PATENT DOCUMENTS

| | | | |
|---|---|---|---|
| 5,307,436 A | 4/1994 | Berkey | |
| 5,450,427 A | 9/1995 | Fermann et al. | |
| 5,499,134 A | 3/1996 | Galvanauskas | |
| 5,627,848 A | 5/1997 | Fermann | |
| 5,633,885 A | 5/1997 | Galvanauskas et al. | |
| 5,689,519 A | 11/1997 | Fermann | |
| 5,696,782 A | 12/1997 | Harter | |
| 5,701,319 A | 12/1997 | Fermann | |
| 5,802,236 A | 9/1998 | DiGiovanni | |
| 5,818,630 A | 10/1998 | Fermann | |
| 5,847,863 A * | 12/1998 | Galvanauskas ....... | H01S 3/0057 359/333 |
| 5,854,865 A | 12/1998 | Goldberg | |
| 5,862,287 A | 1/1999 | Stock et al. | |
| 5,864,644 A | 1/1999 | DiGiovanni et al. | |
| 5,880,877 A | 3/1999 | Fermann | |
| 5,892,615 A | 4/1999 | Grubb et al. | |
| 5,907,652 A | 5/1999 | DiGiovanni et al. | |
| 5,982,963 A | 11/1999 | Feng et al. | |
| 6,034,975 A | 3/2000 | Harter | |
| 6,072,811 A | 6/2000 | Fermann | |
| 6,108,474 A | 8/2000 | Eggleton | |
| 6,151,338 A | 11/2000 | Grubb et al. | |
| 6,198,568 B1 | 3/2001 | Galvanauskas et al. | |
| 6,236,779 B1 | 5/2001 | Kafka | |
| 6,249,630 B1 | 6/2001 | Stok et al. | |
| 6,252,892 B1 | 6/2001 | Jiang | |
| 6,334,019 B1 | 12/2001 | Birks | |
| 6,389,198 B2 | 5/2002 | Kafka | |
| 6,433,306 B1 | 8/2002 | Grubb et al. | |
| 6,445,862 B1 | 9/2002 | Fajardo | |
| 6,570,704 B2 | 5/2003 | Palese | |
| 6,618,531 B1 | 9/2003 | Goto | |
| 6,621,040 B1 | 9/2003 | Perry | |
| 6,631,234 B1 | 10/2003 | Russell et al. | |
| 6,650,466 B1 | 11/2003 | Wise | |
| 6,738,549 B2 | 5/2004 | Inaba et al. | |
| 6,788,865 B2 | 9/2004 | Kawanishi et al. | |
| 6,792,188 B2 | 9/2004 | Libori | |
| 6,804,045 B2 | 10/2004 | Barty | |
| 6,823,093 B2 | 11/2004 | Chang et al. | |
| 6,825,974 B2 | 11/2004 | Kliner et al. | |
| 6,833,954 B2 | 12/2004 | Zweiback et al. | |
| 6,885,683 B1 * | 4/2005 | Fermann ............. | H01S 3/06754 372/25 |
| 6,954,575 B2 | 10/2005 | Fermann | |
| 7,072,101 B2 | 7/2006 | Kapteyn et al. | |
| 7,095,772 B1 | 8/2006 | Delfyett et al. | |
| 7,116,875 B2 | 10/2006 | Wadsworth et al. | |
| 7,167,300 B2 * | 1/2007 | Fermann ............. | H01S 3/06754 359/337.5 |
| 7,257,302 B2 | 8/2007 | Fermann et al. | |
| 7,414,780 B2 | 8/2008 | Fermann et al. | |
| 7,424,185 B2 | 9/2008 | Glebov et al. | |
| 7,518,788 B2 | 4/2009 | Fermann | |
| 7,688,499 B2 | 3/2010 | Fermann et al. | |
| 7,804,864 B2 | 9/2010 | Gu et al. | |
| 7,929,203 B2 | 4/2011 | Harter et al. | |
| 8,120,778 B2 | 2/2012 | Fermann | |
| 8,154,793 B2 | 4/2012 | Wise et al. | |
| 8,228,597 B2 | 7/2012 | Fermann | |
| 8,503,069 B2 | 8/2013 | Fermann | |
| 9,042,004 B2 | 5/2015 | Fermann | |
| 2001/0048788 A1 | 12/2001 | Xie et al. | |
| 2003/0156605 A1 | 8/2003 | Richardson | |
| 2003/0165313 A1 | 9/2003 | Broeng | |
| 2003/0189959 A1 | 10/2003 | Erbert et al. | |
| 2004/0014526 A1 | 1/2004 | Kulas | |
| 2004/0114641 A1 | 6/2004 | Wise et al. | |
| 2004/0190119 A1 | 9/2004 | Tauser | |
| 2005/0018714 A1 | 1/2005 | Fermann | |
| 2005/0169324 A1 | 4/2005 | Ilday et al. | |
| 2005/0105865 A1 | 5/2005 | Fermann | |
| 2005/0238070 A1 | 10/2005 | Imeshev | |
| 2006/0198398 A1 | 9/2006 | Fermann | |
| 2007/0086713 A1 | 4/2007 | Hartl | |
| 2009/0002808 A1 | 11/2009 | Wise | |
| 2011/0002691 A1 * | 1/2011 | Lin .................... | H01S 3/0675 398/118 |
| 2011/0080580 A1 | 4/2011 | Fermann | |

FOREIGN PATENT DOCUMENTS

| | | |
|---|---|---|
| JP | 10333184 A | 12/1998 |
| JP | 11242249 A | 9/1999 |
| JP | 2002-118315 A | 4/2002 |
| JP | 2008-517460 A | 5/2008 |
| WO | 0016141 A1 | 3/2000 |
| WO | 0049435 A1 | 8/2000 |
| WO | 2002012931 A2 | 2/2002 |
| WO | 0239159 | 5/2002 |
| WO | 03032039 | 4/2003 |
| WO | 03038486 A2 | 5/2003 |
| WO | 03079077 | 9/2003 |
| WO | 06113507 A2 | 10/2006 |
| WO | 20060113507 A2 | 10/2006 |
| WO | 2007142843 A2 | 12/2007 |

OTHER PUBLICATIONS

Chuang Y. H. et al., "Propagation of light pulses in a chirped-pulse-amplification laser", J. of Quantum Electronics, vol. 29 No. 1, p. 270-280 1993.
EP05725660.4 Notice of Rejection dated Jul. 25, 2011.
EP05725660.4 response to Notice of Rejection filed Dec. 21, 2011.
Hodel et al. "Chirped Pulse Amplification in Er-doped fibers", Optics Communications, vol. 97 No. 3-4 p. 233-238 1993.
JP2007-536674 Decision of Refusal (JP ver only).
JP2007-536674 Notification of Reasons for Rejection dated Aug. 4, 2009 English Translation 3 pages.
JP2007-536674 Office Action dated Aug. 24, 2010 English Translation.

(56) References Cited

OTHER PUBLICATIONS

JP2007-536674 Office Action Response filed Nov. 18, 2010.
Spielmann et al., "Compact, high-throughput expansion-compression scheme for chirped pulse amplification in the 10 fs range", Optics Communications vol. 120, No. 5 p. 321 1995.
JP2007-536674 Office Action Argument filed Nov. 18, 2010.
Chong et al., "All-normal-dispersion femtosecond fiber laser," Optics Express, vol. 14 Is.21 p. 10095-10100 (2006).
Lim et al., "Femtosecond ytterbium fiber laser with photonic crystal fiber for dispersion control," Optics Express vol. 10, D-3152 p. 1497-1502 (2002).
Idlay et al., "Self-Similar evolution of parabolic pulses in a laser," Physical Review Letter vol. 92, Is.213902 D-3627 (2004).
Zhou et al., "Compensation of nonlinear phase shifts with third-order dispersion in short-pulse fiber amplifiers," Optics Express vol. 13, Is.13 p. 4869-4877 (2005) D-3644.
Liu et al., "High-energy pulse compression by use of negative phase shifts produced by the cascade c (2) c (2) nonlinearity," Optics Letters vol. 24, Is. 23 p. 1777-1779 (1999).
Moses et al., "Chirped-pulse cascaded quadratic compression of millijoule-energy, 35-fs pulses," Lasers and Electro-Optics (CLEO) vol. 2 p. 962-964 (May 2005).
Moses et al., "Solition compression in quadratic media: high-energy few-cycle pulses with frequency-doubling crystal," Optics Letters vol. 31 Is. 12 p. 1881-1883 (2006).
Japanese Office Action (Notice of Reasons for Rejection), dated Oct. 7, 2013; Patent Application No. 2011-284170.
Y.H. Chuang et al, Propagation of Light Pulses in a Chirped-Pulse-Amplification Laser, IEEE Journal of Quantum Electronics, Jan. 1993, vol. 29, No. 1, pp. 270-280.
European Office Action dated Jun. 16, 2014, Patent Application No. EP05 725 66 0.4.
Huard, "Polarization of Light", John Wiley & Sons, Masson, 1997, pp. 271-276.
Loh et al., "10 Gb/s Transmission over 700 km of Standard Single-Mode Fiber with 10-cm Chirped Fiber Grating Compensator and Duobinary Transmitter", IEEE Photonics Technology Letters, vol. 8, No. 9, Sep. 1996, pp. 1258-1260.
Palais et al., "Fiber Optic Communications", Third Edition, Optic Fiber Waveguides, Prentice Hall, 1992, pp. 126-130 (7 pgs. total).
Sumetsky et al., "Reduction of chirped fiber grating group delay ripple penalty through UV post processing", OFC, 2003, PD28-1 to PD28-3 (3 pgs. total).
Desthieux et al., "111kW (0.5 mJ) pulse amplification at 1.5 μm using a gated cascade of three erbium-doped fiber amplifiers", Appl. Phys. Lett., Aug. 2, 1993, vol. 63, No. 5, pp. 586-588.
Galvanauskas et al., "High-energy femtosecond pulse compression in chirped fiber gratings", Friday Morning, CLEO'96, 1996, pp. 499-500.

\* cited by examiner

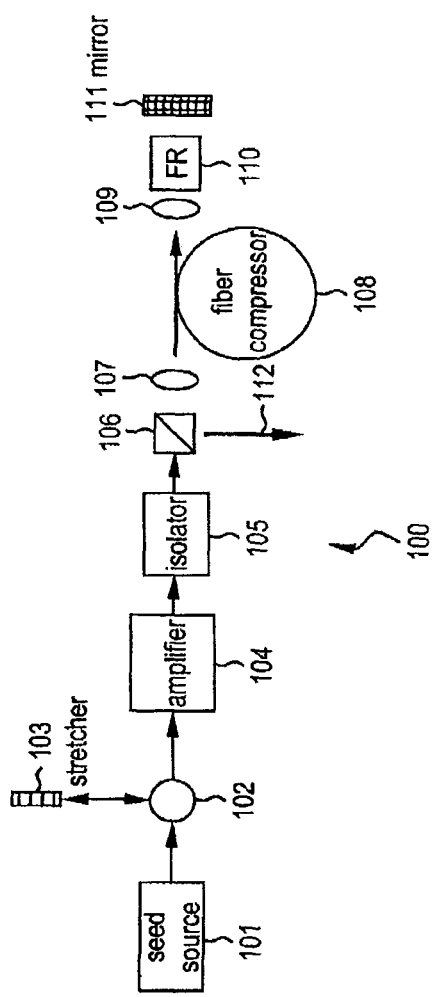

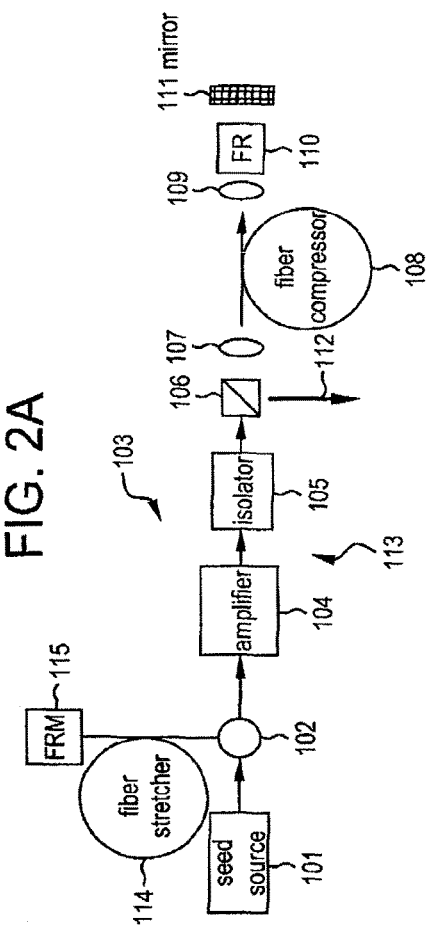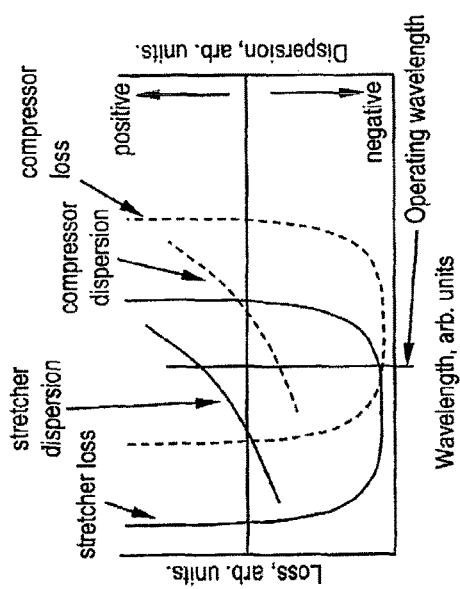
FIG. 2A
FIG. 2B

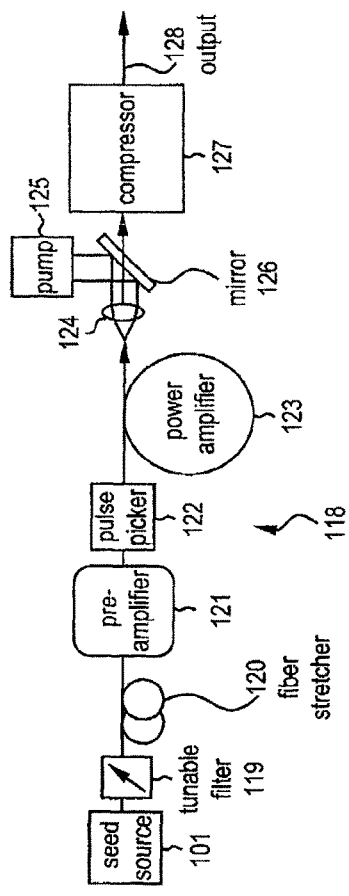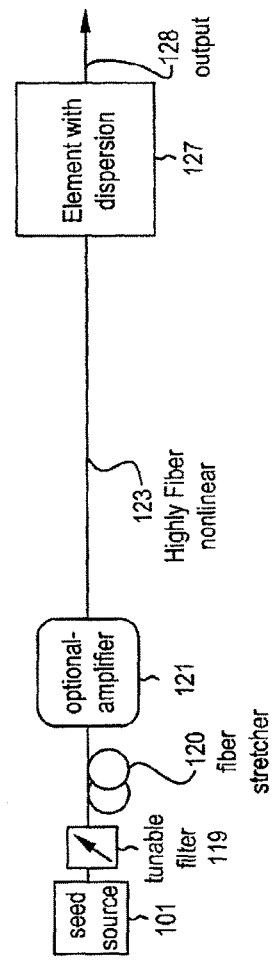

FIG. 7A
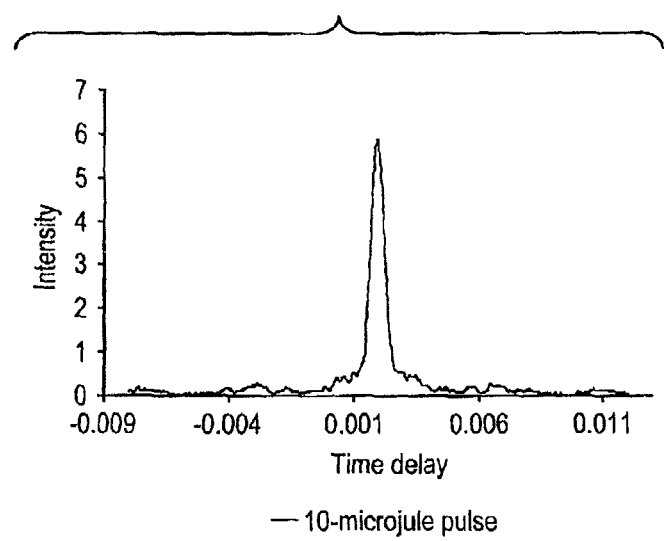
— 10-microjule pulse
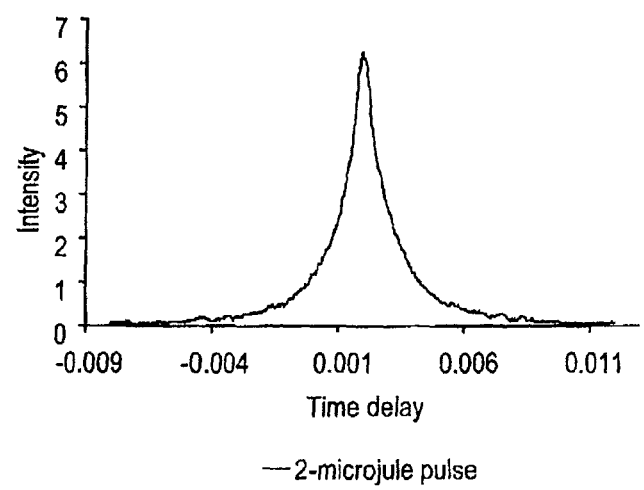
— 2-microjule pulse

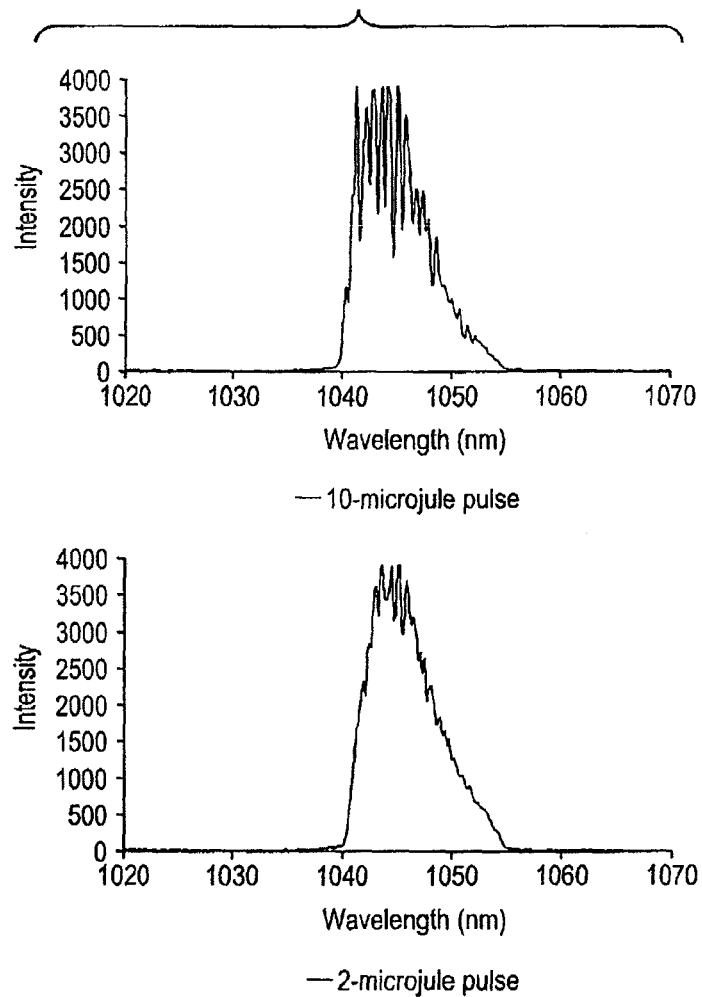

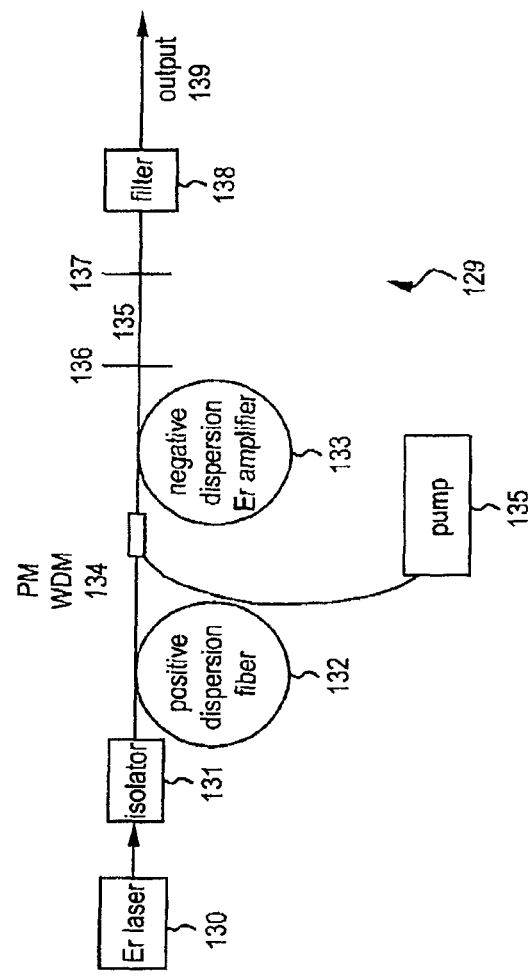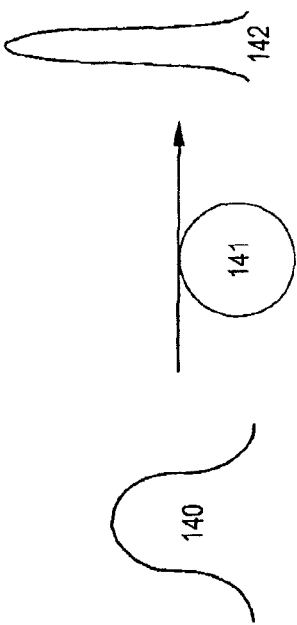

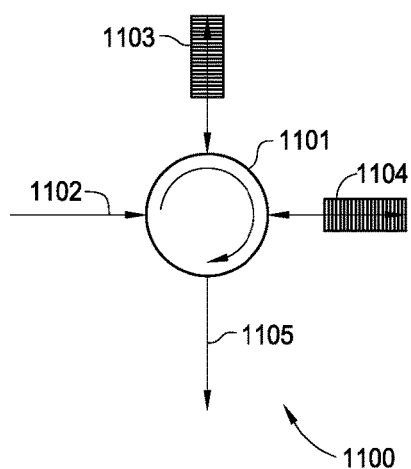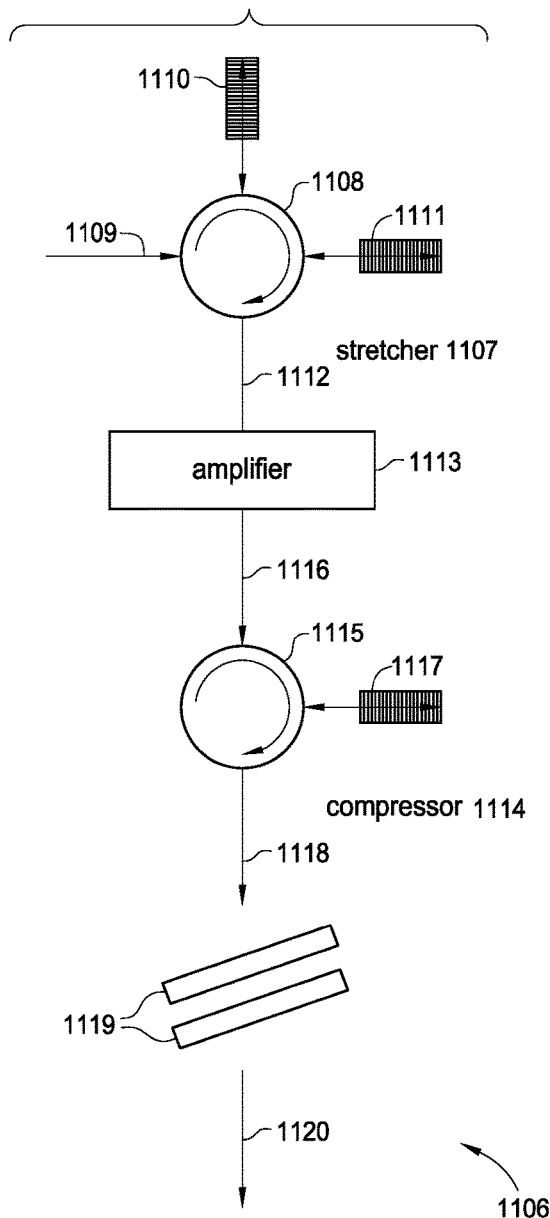

Incoherent addition of femtosecond pulses

ALL-FIBER CHIRPED PULSE AMPLIFICATION SYSTEMS

CROSS-REFERENCES TO RELATED APPLICATIONS

This is a Divisional of U.S. application Ser. No. 13/936,278 filed on Jul. 8, 2013, which is a divisional of Ser. No. 12/851,315 filed on Aug. 5, 2010, now issued as U.S. Pat. No. 8,503,069 on Aug. 6, 2013, which is a Divisional of U.S. application Ser. No. 12/173,094 filed on Jul. 15, 2008, now issued as U.S. Pat. No. 8,228,597 on Jul. 24, 2012, which is a Divisional of U.S. application Ser. No. 10/992,762, filed on Nov. 22, 2004, now issued as U.S. Pat. No. 7,414,780 on Aug. 19, 2008, and is also a Continuation-in-Part of U.S. application Ser. No. 10/608,233 filed on Jun. 30, 2003, now issued as U.S. Pat. No. 7,257,302 on Aug. 14, 2007, the entire disclosures of which are hereby incorporated by reference. This application claims benefit of the filing date of the Provisional Application Ser. No. 60/539,110 filed on Jan. 27, 2004, via parent application Ser. No. 10/992,762, and claims benefit of the filing date of the Provisional Application Ser. No. 60/474,999 filed Jun. 3, 2003, via parent application Ser. No. 10/608,233. The Provisional Applications are incorporated herein by reference for all they disclose.

TECHNICAL FIELD OF THE INVENTION

The present invention is direct to the construction of ultra-compact high-energy fiber pulse sources.

DESCRIPTION OF RELATED ART

Over the last several years, fiber lasers and amplifiers have been regarded as the most promising candidates for ultrafast pulse sources for advanced industrial applications due to their unique simplicity of construction. In general, ultrafast optical pulses have a pulse width of less than 50 picoseconds. Chirped pulse amplification is implemented to enable the amplification of such pulses to the microjoule—millijoule energy range. Generally, chirped pulse amplification systems use a near bandwidth-limited seed pulse source, which is temporally stretched (i.e., chirped) in a pulse stretcher before amplification in a power amplifier. After amplification, the pulses are recompressed to approximately the bandwidth limit using a pulse compressor.

Commercially viable fiber chirped pulse amplification systems were suggested U.S. Pat. No. 5,499,134 issued to A. Galvanauskas et al. The system disclosed in U.S. Pat. No. 5,499,134 relied upon chirped fiber Bragg gratings for pulse stretching. Chirped fiber Bragg gratings have indeed been developed into widely available devices and the chirp inside the Bragg gratings can be designed to be linear or even nonlinear to compensate for any order of dispersion in a chirped pulse amplification system (see U.S. Pat. Nos. 5,847,863 , 5,847,863 to A. Galvanauskas et al.), which is important for the generation of near bandwidth limited pulses after pulse recompression.

Generally, in such systems as a compromise between system compactness and high-energy capability, the use of a chirped fiber Bragg grating pulse stretcher in conjunction with a bulk grating pulse compressor is advantageous, providing at least partial integration for the high-energy fiber amplifier system. Alternative arrangements resorting to the use of bulk stretchers and compressors (as generally used in the state of the art) are generally much more difficult to align, require a significantly larger amount of space for their operation and are only of limited utility in real industrial applications.

Recently, M. Fermann et al. in U.S. patent application Ser. No. 10/608,233 suggested the use of apodized nonlinearly chirped fiber gratings to minimize the mismatch in the dispersion profile between fiber grating pulse stretchers and bulk grating pulse compressors, thereby greatly improving the utility of chirped fiber grating pulse stretchers.

As a further simplification, M. Fermann et al. in U.S. patent application Ser. No. 10/608,233 suggested the use of dispersive photonic crystal fiber as a replacement for bulk grating pulse compressors. The use of dispersive photonic crystal fiber pulse compressors further enables compact fiber beam delivery, i.e., the delivery of an optimally short pulse propagating in a fiber delivery section of extended length onto a specific target material downstream from said fiber delivery section.

For reference, we refer to photonic crystal fiber, as a fiber with a central hole, filled with air (or any other gas) where waveguiding is enabled through photonic bandgaps in the fiber cladding. In contrast, a holey fiber uses guiding in a central glassy core surrounded by holes filled with air (or any other gas) in the cladding. A conventional fiber allows for waveguiding in a core with a refractive index higher than the surrounding cladding and does not use any air-holes anywhere in the fiber cross section.

U.S. Pat. Nos. 6,236,779 and 6,389,198 to J. Kafka et al. suggest the use of low-dispersion holey fibers for beam delivery. However, in contrast to holey fibers, photonic crystal fibers can exhibit substantial linear and higher-order dispersion. Therefore, the delivery of an optimally short optical pulse onto a target material by simply substituting a holey fiber with a photonic crystal fiber is not generally possible.

Moreover, the work by Kafka et al. assumed the use of substantially polarization maintaining holey fibers for beam delivery. No provision was made to accommodate non-polarization maintaining fibers for beam delivery and no provision was made to implement holey fiber as dispersion compensating elements in chirped pulse amplification systems.

U.S. Pat. No. 5,303,314 issued to I. N. Duling et al. suggested the use of Faraday rotator mirrors to provide a single-polarization output from a non-polarization maintaining fiber amplifier. U.S. Pat. No. 5,303,314 did not suggest, however, the use of Faraday rotator mirrors in conjunction with photonic crystal fibers. Moreover, because of the negligible values of first and second order polarization mode dispersion in typical non-polarization maintaining fiber amplifiers, U.S. Pat. No. 5,303,314 did not consider the use of Faraday rotators for the compensation of second-order polarization mode dispersion.

The generation of high-energy pulses in fiber-based chirped pulse amplification systems is generally facilitated with the use of large core fiber amplifiers and specifically large core diffraction limited multi-mode amplifiers, as described in U.S. Pat. No. 5,818,630 issued to M. E. Fermann et al. Recently, M. E. Fermann et al., in U.S. patent application Ser. No. 09/576,722, disclosed modular, widely tunable fiber chirped pulse amplification systems that further enhanced the utility of such fiber laser sources in industrial applications. This modular system suggested the use of an amplitude filter in conjunction with a nonlinear power amplifier for compensation of higher order dispersion in the chirped pulse amplification system. However, M. E. Fermann et al. did not suggest any independent control of second and third-order dispersion with such an amplitude filter. Moreover, Fermann et al., did not suggest the use of a nonlinear amplifier for higher-order dispersion compensation in the presence of gain-narrowing and gain-pulling in the fiber amplifier.

David J. Richardson et al., in U.S. Patent Publication No. 2003/0156605, described system implementations aimed at the amplification of femtosecond—picosecond pulses with fiber amplifiers. Just as in U.S. patent application Ser. No. 09/576,722, Richardson et al. describe a chirped pulse amplification system for the generation of the highest peak power pulses. Also, just as in U.S. patent application Ser. No. 09/576,722, Richardson et al. describe the exploitation of parabolic pulse formation in fiber amplifiers to generate femtosecond pulses in the energy range up to 1-10 microjoules. However, Richardson et al. did not suggest controlling the third-order dispersion in such fiber amplifiers.

The modular system disclosed in U.S. patent application Ser. No. 09/576,722 also suggested the use of an anti-Stokes frequency-shifting fiber in conjunction with an Er fiber laser for injection seeding of an Yb amplifier chain. Of all possible methods for seeding of ultrafast Yb fiber amplifiers, anti-Stokes frequency shifting of an ultra-fast Er fiber laser from the 1.55 micrometer wavelength region to the 1.05 micrometer wavelength region is considered to be the most attractive. The reason is that ultrafast Er fiber lasers can be assembled from standard telecom components, thereby greatly reducing the cost of such systems. Ideally, such a seed source is also tunable in order to allow pulse injection in the complete spectral gain band of Yb fibers, spanning a wavelength range of 980-1150 nanometers.

Recently, U.S. Pat. No. 6,618,531 to T. Goto et al. suggested another tunable short pulse source based on intensity dependent frequency shifting of a short pulse laser source. The tunable source in U.S. Pat. No. 6,618,531 relies on a linear variation of the output pulse frequency with input intensity. No tunable short pulse laser source was suggested that does not rely on linear intensity dependent frequency shifting in an optical fiber. Moreover, U.S. Pat. No. 6,618,531 does not address stability issues for an anti-Stokes frequency shifted fiber laser. Although anti-Stokes frequency shifting may produce a certain desired output wavelength, generally, such a source may not comply with the stability requirements of commercial laser sources. One of the reasons is that anti-Stokes frequency shifting is a highly nonlinear process; hence, tiny seed source variations can produce large amplitude fluctuations. Specifically, the presence of stimulated Raman scattering processes that may accompany anti-Stokes frequency shifting, implemented according to U.S. Pat. No. 6,618,531, can produce very large amplitude fluctuations.

SUMMARY OF THE INVENTION

The invention has been made in view of the above circumstances and has an object to overcome the above problems and limitations of the prior art, and describes ultra-compact ultra-high power fiber amplifier systems for pulses in the fs to ps pulse width range.

Additional aspects and advantages of the invention will be set forth in part in the description that follows and in part will be obvious from the description, or may be learned by practice of the invention. The aspects and advantages of the invention may be realized and attained by means of the instrumentalities and combinations particularly pointed out in the appended claims.

The presented invention relates to the design of ultra-compact high energy chirped pulse amplification systems based on linearly or nonlinearly chirped fiber grating pulse stretchers and photonic crystal fiber pulse compressors. Alternatively, photonic crystal fiber pulse stretchers and photonic crystal fiber compressors can also be implemented. For industrial applications the use of all-fiber chirped pulse amplification systems is preferred, relying on fiber-based pulse compressors and stretchers as well as fiber-based amplifiers.

Fiber-based high energy chirped pulse amplification systems of high utility can also be constructed from conventional optical components such as pulse stretchers based on long lengths of conventional fiber as well as bulk grating compressors. The performance of such 'conventional' chirped pulse amplification systems can be greatly enhanced by exploiting nonlinear cubicon pulse formation, i.e. by minimization of higher-order dispersion via control of self-phase modulation inside the amplifiers.

Finally, a particularly compact seed source for an Yb fiber-based chirped pulse amplification system can be constructed from an anti-Stokes frequency shifted modelocked Er fiber laser amplifier system, where a wavelength tunable output is obtained by filtering of the anti-Stokes frequency shifted output. The noise of such an anti-Stokes frequency shifted source is minimized by the amplification of positively chirped pulses in a negative dispersion fiber amplifier.

The above and other aspects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings, FIG. 1 is a diagram of a generic scheme for a chirped pulse amplification system based on a fiber grating pulse stretcher and a non-polarization maintaining photonic crystal pulse compressor.

FIG. 2a is a diagram of a generic scheme for a chirped pulse amplification system based on a photonic crystal pulse stretcher and a non-polarization maintaining photonic crystal pulse compressor.

FIG. 2b is a diagram of the approximate optimal location of the photonic bandgaps of photonic crystal fibers when used for pulse stretching and recompression.

FIG. 5a is a diagram of a specific Yb fiber-based chirped pulse amplification system based on a fiber pulse stretcher and a conventional bulk grating pulse compressor in conjunction with an optical bandpass filter enabling the control of third-order dispersion via self-phase modulation in a nonlinear power amplifier.

FIG. 5b is another embodiment of this higher order dispersion compensator.

FIG. 7a is an illustration of a typical autocorrelation trace obtained with the compressed output of a specific Yb power amplifier that is part of a fiber-based chirped pulse amplification system at pulse energies of 10 and 2 microjoules.

FIG. 7b is an illustration of a typical pulse spectrum obtained at the output of a specific Yb power amplifier that is part of a fiber-based chirped pulse amplification system at pulse energies of 10 and 2 microjoules.

FIG. 9a is a diagram of an optimal modelocked Er oscillator amplifier system used in conjunction with an anti-Stokes frequency-shifting fiber for seeding of a short pulse Yb fiber amplifier.

FIG. 9b is a diagram illustrating an optimum condition for stable anti-Stokes frequency shifting.

FIG. 11 is a diagram of a generic scheme for concatenating two low group delay ripple chirped fiber Bragg gratings.

FIG. 12 is a diagram of a compact scheme for a chirped pulse amplification system using concatenated chirped fiber Bragg gratings in pulse stretching and compression.

DETAILED DESCRIPTION OF THE INVENTION

Figure 3:
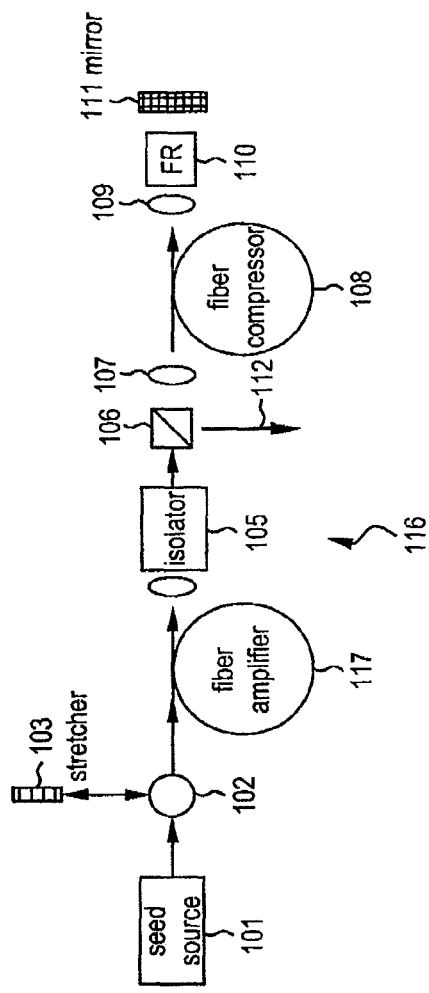
FIG. 3 is a diagram of a generic scheme for a fiber-based chirped pulse amplification system based on a fiber grating pulse stretcher and a non-polarization maintaining photonic crystal pulse compressor.

A detailed description of the preferred embodiments of the invention will now be given referring to the accompanying drawings.

FIG. 1 represents an exemplary embodiment of a chirped pulse amplification system 100 according to the present invention. The system comprises a short pulse seed source 101. The seed source 101 generally supplies pulses having a width less than 50 picosecond. The pulses from seed source 101 are injected into an optical circulator 102 and a fiber Bragg grating stretcher 103 temporally stretches the pulses by at least a factor of ten. All-fiber circulators or bulk optic equivalents of optical circulators can be implemented. U.S. patent application Ser. No. 10/608,233, which is incorporated by reference for all it discloses, discusses such circulators, which will not be further described. The stretched pulses are then directed via the circulator output to an optical amplifier system 104. The optical amplifier system 104 can comprise a bulk-optic multi-pass amplifier, a regenerative amplifier, a parametric amplifier as well as a fiber based amplifier system. In general, optical amplifier systems involve complex optical arrangements and the use of separate pump sources. However, these types of amplifiers are well known in the state of the art and are therefore not separately discussed here.

The output from amplifier 104 is subsequently directed via an isolator 105, a polarization beam splitter 106 and a lens 107 into a photonic crystal fiber compressor 108. Photonic crystal fibers are generally designed with central guiding air-holes that maximize the power handling capability of such fibers. For an optimum chirped pulse amplification system, highly dispersive photonic crystal fibers (characterized by providing large values of chromatic dispersion) are preferable. In general, the control of the polarization state in such highly dispersive photonic crystal fibers is very difficult, and small perturbations in the bandgap structure within such fibers can cause significant first and second order polarization mode-dispersion. Randomly distributed birefringence within such fibers characterizes first order polarization mode dispersion. Randomly distributed wavelength-dependent birefringence within such fibers characterizes second order polarization mode dispersion.

However, a Faraday mirror can compensate for any first and second order polarization mode-dispersion inside the fiber compressor 108. The Faraday mirror comprises a collimating lens 109, a Faraday rotator 110 and a mirror 111. When implementing a 45° rotating Faraday rotator 110, a double-pass through fiber compressor 108 ensures that the backward reflected light propagating through the fiber compressor 108 is in exactly the opposite polarization state compared to the forward propagating light. For a substantially wavelength independent Faraday rotator, the opposite polarization state is obtained in the backward propagating direction regardless of wavelength.

Because the pulses are not compressed after the forward pass through the fiber compressor 108, in systems where peak powers are below the damage threshold of the step-index fiber, a fiber pigtailed Faraday rotator mirror (FRM) with a short pigtail made from conventional step-index fiber may be implemented instead of the collimating lens 109, the Faraday rotator 110 and the mirror 111.

Hence, after a double pass through the fiber compressor 108, temporally compressed output pulses can be extracted in a polarization state orthogonal to the polarization state of the pulses injected into the fiber compressor 108. The polarization beam splitter 106 extracts these orthogonally polarized pulses, and the pulses are designated here with arrow 112.

Though the use of fiber Bragg grating pulse stretchers in conjunction with photonic crystal fiber pulse compressors provides a very compact system set-up, group delay ripple in fiber Bragg grating pulse stretchers is difficult to control and can produce undesirable backgrounds in the compressed output pulses. This problem can be avoided by implementing photonic crystal fibers both for pulse stretching as well as pulse recompression. An exemplary implementation of such a system 113 is shown in FIG. 2a. The system displayed in FIG. 2a is nearly identical to the system displayed in FIG. 1, and the identical reference numerals will be used for the common elements. The fiber Bragg grating stretcher 103 is replaced, however, with a photonic crystal fiber pulse stretcher 114 in conjunction with a Faraday rotator mirror 115. The Faraday rotator mirror (FRM) 115 is used to compensate polarization mode dispersion in the photonic crystal fiber pulse stretcher 114, as in the example described in FIG. 1. A fiber pigtailed FRM 115 can be implemented, where the pigtailed FRM 115 can be directly spliced to the photonic crystal fiber stretcher 114, ensuring a very compact set up. The FRM pigtail 115 can be made from conventional step-index fiber.

To use a photonic crystal fiber both for pulse stretching as well as pulse compression, two photonic bandgap fibers of different design need to be used, i.e., the location of the photonic bandgaps in the two fibers must be different, such that the dispersion of the two photonic bandgap fibers are approximately opposite. Referring to FIG. 2b, the pulse stretcher has a bandgap center blue-shifted compared to the compressor bandgap center. The stretcher-compressor designation is arbitrary here, as the opposite configuration is also possible.

Particularly compact high-energy pulse amplification systems can be realized by the incorporation of optical fibers not only in the pulse stretching and compression stages, but also in the amplification stages. Referring to FIG. 3, a system 116 is shown, which is very similar to system 100, and the identical reference numerals will be used for the common elements. The amplifier system 104 is replaced with a fiber amplifier 117. Though FIG. 3 shows only one fiber amplifier, fiber amplifier chains with additional pulse-picking or down-counting optical modulators or isolators can be used to generate high energy pulses. U.S. patent application Ser. No. 10/608,233 discloses such fiber amplifier chains. Preferably, fiber amplifiers that handle the largest optical intensities are constructed from large mode polarization maintaining fiber.

A specific design implementation of a system according to FIG. 3 uses a seed source 101 based on a modelocked Er fiber laser that provides 400 femtosecond near bandwidth limited pulses with an average power of 5 milliwatts at a repetition rate of 50 megahertz and a wavelength of 1558 nanometers. The spectral width of the source was 7.6 nanometers. The pulses from the Er laser were stretched via a fiber grating pulse stretcher 103 to a width of 100 picoseconds. The fiber grating pulse stretcher was designed with a second-order (chromatic) dispersion value of 26.8 ps$^2$ and a third-order (chromatic) dispersion value of 1.02 ps$^3$ to approximately match the chromatic dispersion of the photonic crystal fiber compressor 108.

For simplicity, only a single Er fiber amplifier 117 was used in this specific design example. The Er fiber amplifier produced an output power of 70 milliwatts at a wavelength of 1558 nanometers. The Er fiber amplifier was further isolated at each end from the rest of the optical components. The isolator at the input end to the fiber amplifier 117 is not shown; the isolator at the output of the fiber amplifier 117 is the isolator 105. An additional length of conventional step-index single-mode fiber was inserted between the fiber stretcher 103 and the fiber circulator 102 for fine control of the chromatic dispersion of the whole system.

Note that the pulse energy generated in the present fiber amplifier 117 is only 1.4 nanojoules. In order to increase the pulse energy, additional fiber amplifiers stages and pulse pickers need to be incorporated, e.g., as discussed in U.S. patent application Ser. No. 10/608,233.

The photonic crystal fiber compressor 108 has a length of 9.56 meters. The central air-hole had a diameter of 6 micrometers. The photonic bandgap was centered at 1515 nanometers and had a spectral width of nearly 200 nanometers. At 1560 nanometers, the photonic crystal fiber had a loss of less than 0.2 dB/m, i.e., a transmission of around 30% could be achieved in a double-pass through the photonic crystal fiber, comparable to the transmission loss of typical bulk grating compressors. The dispersion of the photonic crystal fiber was measured separately using standard techniques well known in the state of the art. The dispersion of the photonic crystal fiber was used as the input parameter for the design of the fiber Bragg grating pulse stretchers as explained above.

Without the use of the Faraday rotator mirror (components 109-111), the pulses at the output 112 from the system were not compressible and exhibited large pedestals. These pedestals could not be eliminated when using broad-band polarization control with quarter- and half-waveplates at the input to the compressor. The spectrum of the pulses transmitted through the photonic bandgap fiber as observed through a polarizer exhibited close to 100% modulation, with the shape dependent on the input polarization state. This is a clear indication of first and second-order polarization mode-dispersion in the photonic crystal fiber compressor.

Figure 4:
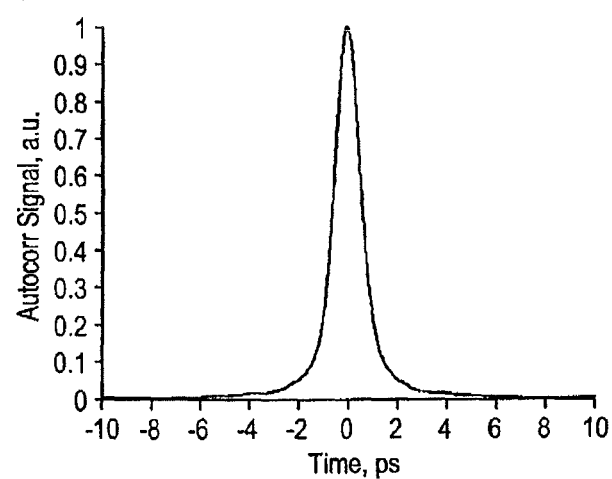
FIG. 4 is an autocorrelation of a recompressed pulse obtained with a specific Er fiber based chirped pulse amplification system based on a photonic crystal fiber compressor.

In contrast, when inserting the Faraday rotator mirror, high quality, compressed pulses were obtainable at output 112. An autocorrelation of the compressed pulses is shown in FIG. 4. The pulses have a temporal half width of around 800 femtoseconds and are within a factor of two of the bandwidth limit. The deviation from the bandwidth limit is attributed to some residual un-compensated third-order dispersion between the fiber Bragg grating stretcher 103 and the photonic crystal compressor 108 which can be eliminated with improved design parameters for the fiber Bragg grating stretcher.

Though the previous descriptions related to highly integrated and ultra-compact chirped pulse amplification systems, some applications can tolerate more conventional system concepts relying on the use of conventional fiber stretchers, fiber amplifiers and bulk grating compressors. In order to obtain high quality pulses from such systems, the control of higher-order dispersion and self-phase modulation is critical. A chirped pulse amplification system allowing for independent control of second-and third order dispersion is shown in FIG. 5. In an exemplary embodiment, a seed source 101 based on a passively modelocked Yb fiber laser was used. Such passively modelocked Yb fiber lasers were previously described in application Ser. No. 10/627,069 and are not further described here. The seed source 101 produces positively chirped optical pulses with a bandwidth of 16 nanometers at a repetition rate of 43 megahertz with an average power of 16 milliwatts. The peak emission wavelength of the oscillator was 1053 nanometers. The pulses from the seed source were compressible to a pulse width of less than 150 femtoseconds, demonstrating that the chirp from the seed source was approximately linear. The output from the seed laser passed through an isolator (not shown) and a tunable bandpass filter 119 with a 15 nanometer bandwidth.

After the bandpass filter 119, an output power of 5 milliwatts was obtained and a fiber stretcher 120 was used to stretch the pulses to a width of approximately 100 picoseconds. The fiber stretcher employed for producing stretched pulses had a length of approximately 200 meters and was based on conventional polarization maintaining single-mode step-index fiber. In FIG. 5, the tunable bandpass filter 119 is shown inserted before the fiber stretcher 120; alternatively, the tunable bandpass filter 119 can also be inserted after the fiber stretcher 120 (system implementation is not separately shown).

A subsequent Yb-based polarization maintaining pre-amplifier 121 amplifies the stretched pulses to an average power of 500 milliwatts. A pulse picker 122, based on an acousto-optic modulator and pig-tailed with polarization maintaining fiber, reduces the repetition rate of the pulses to 200 kilohertz, resulting in an average power of 1 milliwatt. The pulses from the pulse picker 122 were subsequently injected into a large-mode polarization maintaining Yb fiber power amplifier 123 and amplified to an average power of 950 milliwatts. The Yb power amplifier had a length of 3 meters and the fundamental mode spot size in the Yb power amplifier was around 25 micrometers. All fibers were either spliced together with their polarization axes aligned or connected to each other (with their polarization axes aligned) with appropriate mode-matching optics (not shown). The power amplifier 123 was cladding pumped via a lens 124 with a pump source 125, delivering a pump power of about 10 watts at a wavelength of 980 nanometers. A beam splitting mirror 126 was implemented to separate the pump light from the amplified signal light. The amplified and stretched pulses from the power amplifier 123 were compressed in a conventional bulk optics compressor 127 based on a single diffraction grating with a groove density of 1200 lines/mm, operating near the Littrow angle. Such bulk optics compressors are well known in the state of the art and are not further explained here. After the bulk optics compressor 127, the output 128 contained pulses with a full-width half-maximum (FWHM) width of around 330 femtoseconds and an average power of 440 milliwatts, corresponding to a pulse energy of 2.2 microjoules.

Figure 6A:
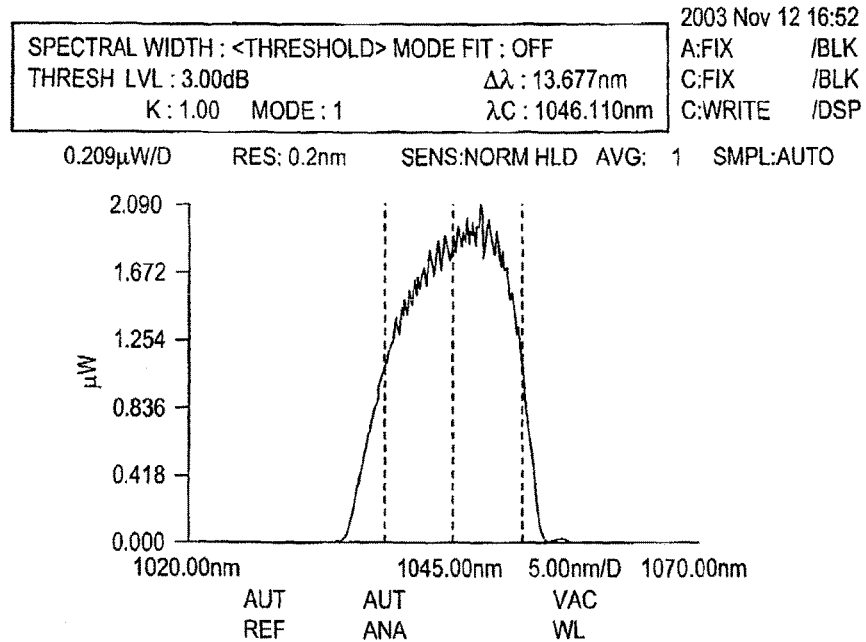
FIG. 6a is an illustration of a typical optimum pulse spectrum injected into a specific Yb power amplifier that is part of a fiber-based chirped pulse amplification system.
Figure 6B:
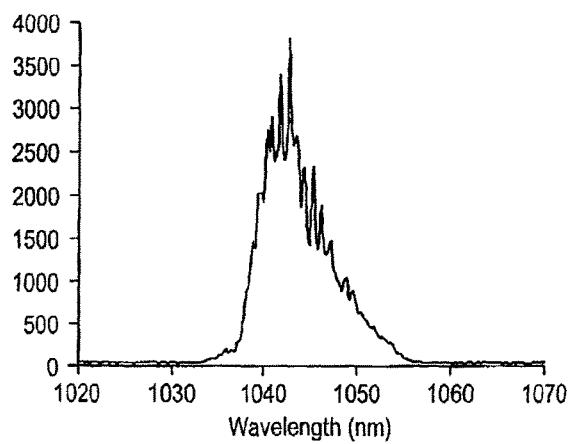
FIG. 6b is an illustration of a typical pulse spectrum obtained at the output of a specific Yb power amplifier that is part of a fiber-based chirped pulse amplification system.
Figure 6C:
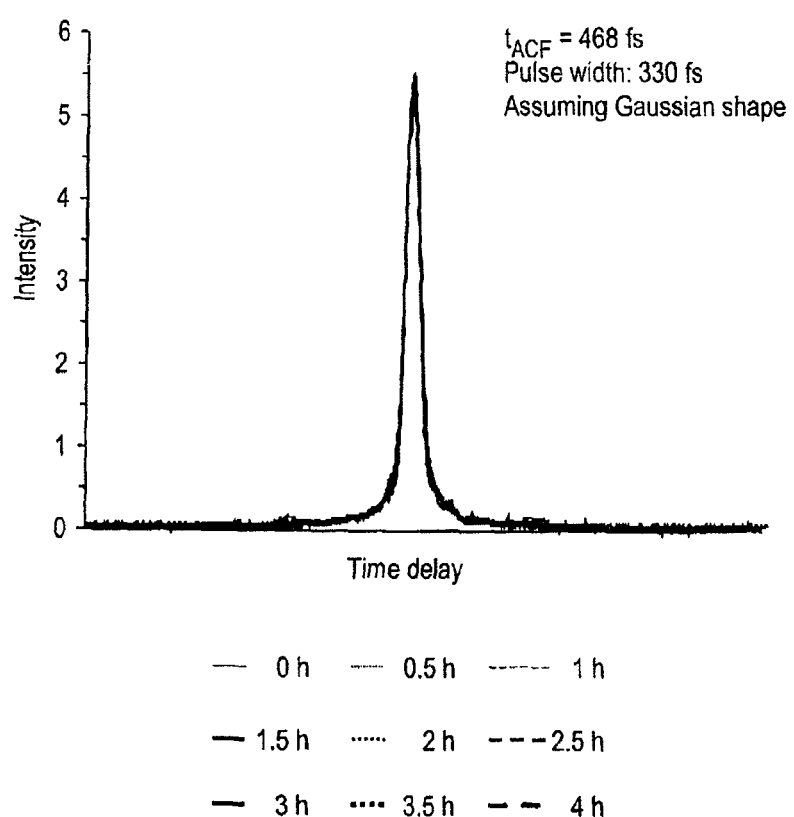
FIG. 6c is an illustration of a typical autocorrelation trace obtained with the compressed output of a specific Yb power amplifier that is part of a fiber-based chirped pulse amplification system.

The pulse spectrum injected into the power amplifier is shown in FIG. 6a, the pulse spectrum obtained after the power amplifier is shown in FIG. 6b and the corresponding autocorrelation of the compressed output pulses is shown in FIG. 6c. As evident from the autocorrelation trace, a very good pulse quality can be obtained from the present system. Moreover, a comparison of FIGS. 6a and 6b shows that there is significant gain-narrowing in the power amplifier. Moreover, due to gain-pulling, the peak of the spectrum blue shifts by around 5 nanometers between the input and output spectrum. Gain-pulling arises because the peak gain of the Yb amplifier is around 1030-1040 nanometers, whereas the injected pulse spectrum is centered around 1048 nanometers. A shift of the average optical frequency in the amplification process may further characterize gain-pulling.

Gain-pulling preferentially amplifies the blue spectral components of the injected pulse spectrum, which in the presence of self-phase modulation generates a larger phase delay for the blue spectral components compared to the red spectral components. This spectrally dependent nonlinear phase delay is equivalent to an added negative third-order dispersion in the stretched output pulses. For a certain output power and a certain input pulse spectrum, the positive third-order dispersion from the fiber stretcher and bulk grating compressor can thus be completely compensated.

In addition to gain-narrowing and gain pulling, gain depletion can further induce nonlinear contributions to $2^{nd}$ and $3^{rd}$ order dispersion via resonant dispersion as well as resonant self-phase modulation. Resonant dispersion arises from the optical phase-modulation associated with the population difference between the upper and lower gain level in the amplifier and is well known in the state of the art. Resonant self-phase modulation arises from the time-dependent change in population difference between the upper and lower gain level in the amplifier during substantial levels of gain depletion by one single pulse during the amplification process. Resonant self-phase modulation is known mainly from semiconductor physics, but is occurs also in fiber gain media. Though in the present example these resonant amplifier effects provide only a small contribution to the value of nonlinear dispersion, resonant effects can be used to modify and optimize the amount of nonlinear dispersion created during the amplification process.

Because stretched pulses can accumulate significant levels of third-order dispersion in the presence of self-phase modulation, gain-narrowing, gain-pulling and gain depletion, we suggest to refer to such pulses as cubicons. More generally, we can define a cubicon as a pulse that produces controllable levels of at least linear and quadratic pulse chirp in the presence of at least substantial levels of self-phase modulation (corresponding to a nonlinear phase delay >1) that can be at least partially compensated by dispersive delay lines that produce significant levels of second and third-order dispersion as well as higher-order dispersion. (Please note that for the compensation of linear pulse chirp, a dispersive delay line with second order dispersion is required, whereas for the compensation of quadratic pulse chirp, a dispersive delay line with third order dispersion is required and so on for higher orders of pulse chirp.) For a dispersive delay line to produce a significant level of $2^{nd}$ and $3^{rd}$ as well as possibly higher-order dispersion, the stretched pulses are typically compressed by more than a factor of 30. In addition cubicons can also be formed in the presence of resonant amplifier dispersion, gain narrowing, gain pulling as well as gain depletion, where we refer to gain depletion as an appreciable reduction in gain due to a single pulse.

In this particular example, the stretched pulses are compressed by a factor of around 300. In this, a compression factor of two can be attributed to gain narrowing in the power amplifier; without cubicon formation the minimum compressed pulse widths would be limited to around 600-800 fs, corresponding to a compression factor of only 70. Cubicon formation in the power amplifier allows pulse compression down to 330 fs.

Note that in contrast to the highly asymmetric—near triangular-spectral shapes of cubicons, parabolic pulses (sometimes also referred to as similaritons by those familiar with the state of the art) as discussed in U.S. patent application Ser. No. 09/576,722, preferably have a highly symmetric—near parabolic-pulse spectrum.

Referring back to FIGS. 5 and 6, simulations based on an application of the nonlinear Schrödinger equation show that for stretched pulses with a width of around 100 picoseconds, an optimum compensation of third-order dispersion in the system is obtained at a nonlinear phase delay of about $\pi$-$2\pi$. An optimum injection spectrum has a spectral width of around 8-14 nanometers and the position of the peak of the injected pulse spectrum is ideally red-shifted by around 4-20 nanometers from the peak of the Yb power amplifier gain profile. As mentioned above, the present Yb amplifier had a peak spectral gain at around 1030-1040 nanometers. Hence, an ideal injected pulse spectrum is centered between 1035-1060 nanometers, and preferably between 1044-1054 nanometers.

A signature of the nonlinear compensation of third-order dispersion in fiber chirped pulse amplification systems is an improvement in pulse quality observed with an increase in pulse energy or pump energy in the presence of self-phase modulation in the final amplifier. Note that pulse quality has to be distinguished from the pulse width. For example in a similariton pulse amplifier, the compressed pulse width generally decreases with an increase in pulse energy level as discussed in U.S. patent application Ser. No. 09/576,722. However, the corresponding improvement in pulse quality is small. Note that pulse quality can be defined for example as the ratio: (full width half-maximum pulse width)/(root mean square pulse width); both those two definitions are well known in the state of the art. In contrast in cubicon pulse amplifiers, the compressed pulse width also decreases with an increase in pulse energy level, however, the improvement in pulse quality is generally larger, moreover, substantial pulse wings as induced by mismatched third-order dispersion between pulse stretcher and compressor can be greatly suppressed. In contrast, similariton pulse amplifiers cannot compensate the mismatch of third-order dispersion between pulse stretcher and compressor. The signature for a system that include this invention is to observe the temporal pulse quality and measure the higher order dispersion terms. It will be noted that the higher order dispersion decreases with higher pulse energy. Another surprising observable is that the spectrum can have additional ripple due to self-phase modulation but the pulse quality improves. Pulse quality improvement means a shorter or same pulse width with less energy in the wings. In conventional fiber optic systems additional self phase modulation ripple will reduce the pulse quality.

Also, in conventional chirped pulse amplification systems, the pulse quality tends to deteriorate with an increase in energy level, especially in the presence of self-phase modulation in the final amplifier. The improvement in pulse quality with pulse energy is further illustrated in FIGS. 7a and 7b, showing the autocorrelation trace of compressed pulses at a pulse energy of 10 and 2 microjoules (FIG. 7a) as well as the corresponding pulse spectra (FIG. 7b) obtained with the system configuration shown in FIG. 5 with some small modifications explained below.

In order to increase the obtainable pulse energy to 10 microjoules, the fiber stretcher 120 was increased to a length of 500 meters and the compressor 127 was changed to comprise a bulk compressor grating with a grating period of 1500 l/mm. Also, a second pre-amplifier and a second pulse picker were inserted in front of the power amplifier 123, which are not separately shown. To enable the generation of pulses with an energy up to 10 microjoules at an average output power of around 1 watt (corresponding to an output power of 500 milliwatts after pulse compression), the pulse repetition rate was reduced to 50 kilohertz with the second pulse picker, whereas the 2 microjoule results were obtained at a pulse repetition rate of 200 kilohertz.

Figure 7C:
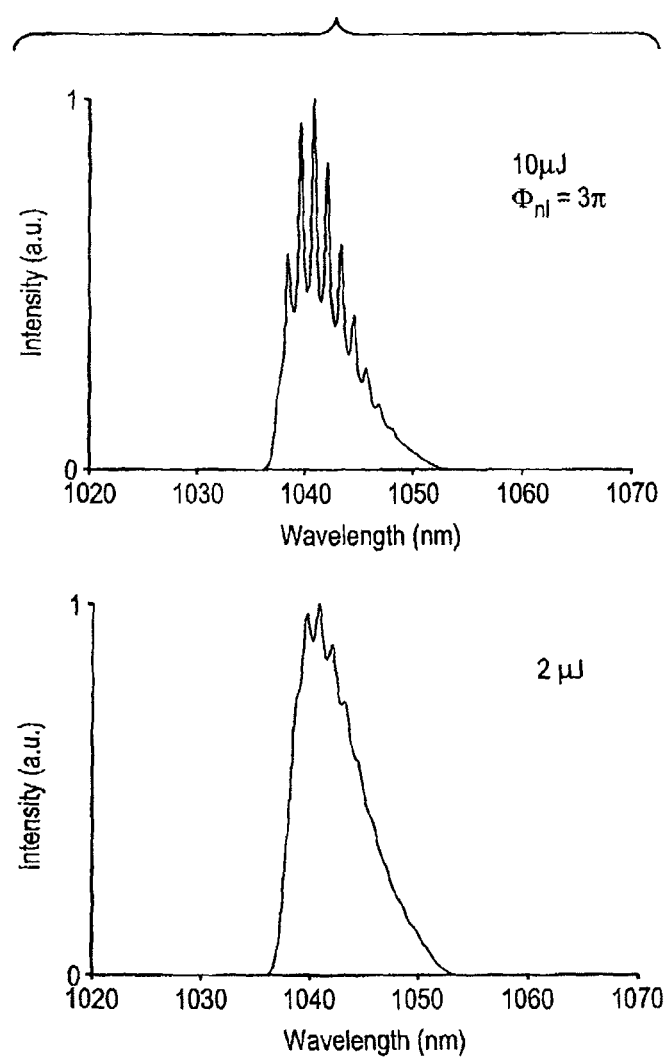
FIG. 7c is an illustration of a theoretically calculated pulse spectrum obtained at the output of the Yb power amplifier used in a fiber-based chirped pulse amplification system as in FIGS. 7 and 7b at pulse energies of 10 and 2 microjoules.

With the system configuration having a 500 meter fiber stretcher length, pulses with an energy of 2 microjoules exhibited some distinct extended tails due to third-order dispersion as shown in FIG. 7a, whereas the pulse spectrum shown in FIG. 7b is of high quality and only weakly modulated. The pulse width is around 730 femtoseconds. When increasing the pulse energy to 10 microjoules, the extended pulse tails are greatly suppressed and a pulse width of around 400 femtoseconds is obtained, as shown in FIG. 7a. In contrast, the spectral quality deteriorates for 10 microjoules, as evident from the increased modulation in the pulse spectrum shown in FIG. 7b. From computer simulations, it can be shown that the level of self-phase modulation in the power amplifier 123 for a pulse energy of 10 microjoules is around 2-$4\pi$. The peak power of the stretched pulses in the power amplifier can be calculated to be between 100-200 kilowatts. The result of the computer simulations, showing pulse spectra at 10 and 2 microjoules of pulse energy is further shown in FIG. 7c. A very good correspondence between the experimental results from FIG. 7b and the theoretical simulations in FIG. 7c is evident. A clear signature of operating a fiber power amplifier in chirped pulse amplification systems at large levels of self-phase modulation is the increase in spectral amplitude ripple with an increase in pulse energy, as shown in FIGS. 7b and 7c.

From these calculations, it can further be shown that the amount of tolerable self-phase modulation in a fiber power amplifier that is part of a chirped pulse amplification system increases with pulse stretching, at least the maximum achievable pulse energy is expected to increase linearly with fiber stretcher length. When using a fiber stretcher length of 2000 meters, a nonlinear phase delay between 3-$10\pi$ can be tolerated even for imperfect seed pulses into fiber power amplifiers as in the present experimental configuration.

Stimulated Raman scattering typically occurs for levels of self-phase modulation between 10-$20\pi$. With the present experimental configuration, pulse energies up to 100 microjoules are possible for a fiber stretcher length of 2000 meters and a nonlinear phase delay of around 3-$10\pi$ inside the power amplifier. To ensure that such high-levels of self-phase modulation are tolerated, the level of spectral amplitude ripple of the pulse spectra injected into the power amplifier needs to be further minimized. Techniques for minimizing spectral ripple in fiber chirped pulse amplification systems were already described in U.S. patent application Ser. No. 10/608,233 and are not further discussed here.

Generally, optimal fiber chirped pulse amplification systems can be characterized by employing simple fiber stretchers for pulse stretching and by exhibiting an improvement in pulse quality observed with an increase in pulse energy at levels of pulse energy where appreciable third-order dispersion and self-phase modulation occurs. This third-order dispersion is dominantly provided by a conventional bulk grating compressor, which produces a level of third-order dispersion 2-10 times larger compared to the third-order dispersion of a standard single-mode fiber operating at a wavelength of 1050 nanometers. Self-phase modulation is provided by amplifying pulses with a sufficient pulse energy. Optimum is a level of self-phase modulation between 0.3-10π. A clear signature of appreciable self-phase modulation in the power amplifier is an increase in spectral modulation with an increase in pulse energy.

The pulse quality is further improved by the presence of gain-narrowing and gain-pulling to shorter wavelengths. The amplified spectral width should be less than 10 nanometers in the wavelength range from 1030-1060 nanometers, whereas gain-pulling should produce a shift in the spectral peak by around 1-10 nanometers between the injected and amplified pulse spectrum. Moreover, an optimum injection spectrum to enable pulse cleaning in the presence of self-phase modulation should be centered in the wavelength range from 1035-1065 nanometers.

Figure 8:
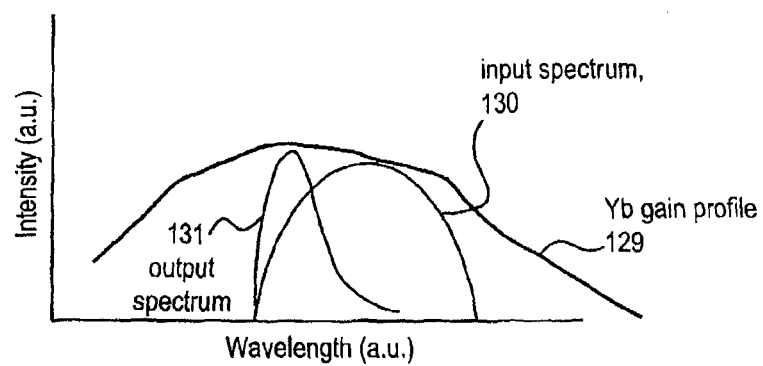
FIG. 8 is an illustration of an optimum pulse spectrum with respect to a typical Yb amplifier gain spectrum as utilized for the control of third-order dispersion in a non-linear high-power Yb amplifier.

The effect of gain-pulling in the present Yb power amplifier is further illustrated in FIG. 8. The Yb gain profile in the power amplifier is represented with line 129. An optimum input spectrum into the power amplifier is represented with line 130. A typical gain-narrowed output spectrum is represented with line 131. A parabolic spectral input is shown only as an example; in general, any spectral input shape can be used and the effect of gain-pulling can still be observed.

The system illustrated in FIG. 5 is a great simplification to the prior art, (U.S. patent application Ser. No. 09/576,722), where an arbitrary (and very costly) amplitude filter was disclosed to enable higher-order dispersion control via self-phase modulation. The key simplification in the present system is that no complex amplitude filter is required, rather via the the effects of gain-narrowing and gain-pulling, the fiber gain medium itself acts like a self-optimized amplitude filter, already optimized to produce a near optimum in compressed pulse quality. Another key simplification in the system illustrated in FIG. 5 is that the implementation of the tunable bandpass filter 119 allows for essentially independent control of third-and second order dispersion, i.e., the third-order dispersion of the system can be solely manipulated by adjusting the center wavelength of the input spectrum via tunable bandpass filter 119. Though the adjustment of the tunable bandpass filter 119 also affects the second-order dispersion of the system, the second-order dispersion can be subsequently minimized by simply adjusting the dispersive optical path in the bulk grating compressor 127.

A specific deterministic alignment method for the tunable bandpass filter 119 can, for example, take advantage of measuring the compressed pulse phase via a frequency-resolved optical gating (FROG) instrument (or any other pulse phase retrieval technique). In this, a FROG trace is first linearized by adjustment of the tunable bandpass filter 119, which minimizes third-order dispersion in the system. The autocorrelation width extracted from the FROG trace is subsequently minimized by adjustment of the dispersive optical path in the compressor to produce the shortest possible output pulses.

To enable higher-order dispersion control with an optical filter therefore, the spectral bandwidth of the seed source should be larger than the spectral bandwidth of the optical filter. Moreover, smooth Gaussian, parabolically or rectangularly shaped input pulse spectra are desirable into the amplifier to minimize any unwanted pulse distortions due to self-phase modulations. Even in the absence of smooth Gaussian, parabolic or rectangular input pulses, strong spectral shaping in the power amplifier 123 can still produce the desirable effect of third-order dispersion compensation with self-phase modulation.

As an alternative to the use of an optical filter for third-order dispersion control in the chirped pulse amplification system displayed in FIG. 5, a seed source 101 with a specified spectral output can also be used. However, because the control of third-order dispersion is critically dependent on the input pulse spectrum, an implementation with an optical filter and a seed source bandwidth exceeding the bandwidth of the filter is easier to implement.

The control of third-order dispersion with self-phase modulation or the control of third-order dispersion in general can further be facilitated by the incorporation of stretcher fibers 120 with a value of third-order dispersion, which balances or reduces the absolute magnitude of the third-order dispersion of the compressor 127. As disclosed in U.S. patent application Ser. No. 09/576,722, such fibers with modified values of third-order dispersion can comprise conventional step-index and holey fiber, as well as photonic crystal fibers, as discussed in U.S. patent application Ser. No. 10/608,233, the disclosure of which is incorporated by reference in its entirety. U.S. Pat. No. 5,802,236 issued to DiGiovanni et al., U.S. Pat. No. 6,445,862 issued to Fajardo et al., U.S. Pat. No. 6,792,188 issued to Libori et al. and WO 02/12931 of Libori et al. disclose specific design examples for holey fibers with modified values of third-order dispersion.

FIG. 5 *b* is another embodiment of this higher order dispersion compensator. It consists of an input pulse stretcher and an amplitude filter. These could be the same component such as a fiber grating, or separate such as a long fiber with dispersion and a filter. This creates a stretched asymmetrically shaped pulse that is input into a fiber that causes self-phase modulation. Thus the amount of phase shift is determined by the amplitude. This allows the correction of higher order dispersion. For systems of interest this fiber could also provide gain, or the gain could be provided by a separate fiber.

Equally, the cubicon pulses as described here can also be used to obtain high peak power stretched pulses, which can then be compressed in photonic crystal fibers as described with reference to FIGS. 1-4. Since photonic crystal fiber compressors produce negative values of third-order dispersion, cubicon pulses which produce positive values of nonlinear third-order dispersion are preferred to enable efficient pulse compression. Such cubicon pulses can for example be generated by pulse injection on the blue side of the spectral gain peak. An implementation using cubicon pulses in conjunction with photonic fiber compressors is similar to the implementation shown in FIG. 1, where the fiber grating stretcher 103 is replaced with a length of fiber stretcher. Such an implementation is not separately shown.

Referring to FIG. 9*a*, a commercially usable anti-Stokes frequency shifted Er fiber laser system 129 is shown. An ultrafast Er (or Er/Yb) fiber laser 130 is used as the front end of the system. Such an Er fiber laser was for example described in U.S. application Ser. No. 10/627,069 and is not further discussed here. The output of the ultrafast Er fiber laser is transmitted through isolator 131 and a length of positive dispersion fiber 132 temporally stretches the pulses. A negative dispersion Er amplifier 133 amplifies the temporally stretched pulses. Herein, a positive dispersion fiber is referred to as non-soliton supporting fiber, and negative dispersion fibers are referred to as soliton supporting fiber. The Er fiber amplifier 133 is pumped via the wavelength division multiplexing (WDM) coupler 134 with a single-frequency pump laser 135. Ideally, all the fibers transmitting the pulses from the Er fiber lasers are polarization maintaining and spliced together in a polarization maintaining fashion to ensure optimum stability of the system. The output from the negative dispersion Er fiber amplifier 133 is injected into a highly nonlinear fiber 135, which is connected to the rest of the system via splices 136 and 137. The output of the highly nonlinear fiber is then spliced to the polarization maintaining pigtail of a tunable optical filter 138. The output of the system is designated with arrow 139.

The highly nonlinear fiber 135 is preferably dispersion flattened and has a value of dispersion at 1560 nanometers between −1 and −10 $ps^2$/km, i.e., the highly nonlinear fiber is preferably soliton supporting and has a reduced value of negative dispersion compared to a standard transmission fiber as used in telecommunications. Four-wave-mixing in the highly nonlinear fiber can thus produce a spectral output simultaneously near 1050 nanometers and near 3000 nanometers, where the long-wavelength output is strongly attenuated due to fiber absorption. The blue-shifted output in the 1 micrometer wavelength region is referred to here as the anti-Stokes output.

The positive dispersion fiber 132 produces positively chirped pulses, which the negative dispersion fiber 133 subsequently amplifies and simultaneously compresses. By amplifying positively chirped pulses in the negatively chirped fiber, the threshold for pulse break-up in the negative dispersion fiber can be minimized and a compressed pulse with a maximum pulse energy can be generated.

This is further illustrated in FIG. 9b. Line 140 represents the temporal profile of a positively chirped pulse, which is amplified in negative dispersion fiber 141. At the output of the negative dispersion fiber 141, a compressed and amplified pulse with a temporal profile schematically represented with line 142 is generated. Preferably, the pulse chirp at the input to fiber 141 and the length of fiber 141 are selected such that after linear amplification an optimally compressed pulse is obtained at the output of fiber 141.

Figure 10:
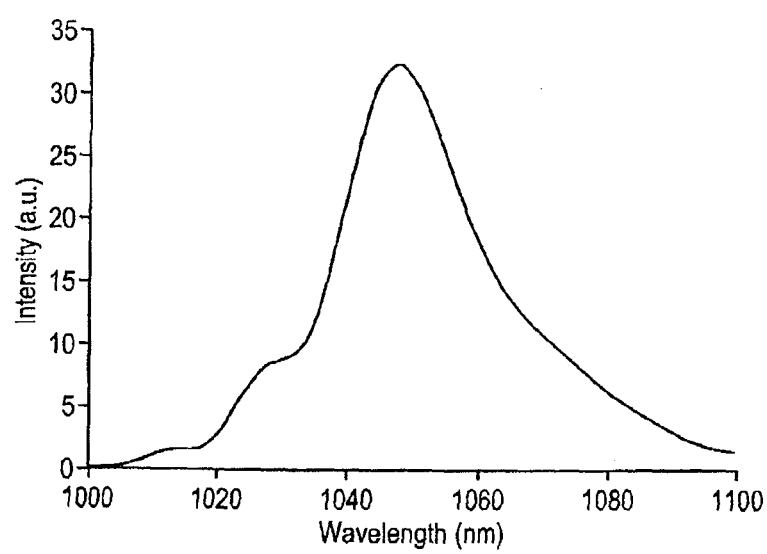
FIG. 10 is a diagram of an optical spectrum obtained with an anti-Stokes frequency shifted Er fiber laser.

In an actual system demonstration according to FIG. 9a, an Er laser produced 1.5 picosecond positively chirped pulses with a spectral bandwidth of 12 nanometers at a repetition rate of 70 megahertz and an average power of 5 milliwatts. Thus, the fiber 132 was eliminated. The pulses were amplified to a power level of 100 milliwatts in a 1.5 meter length of negative dispersion fiber 133 with a core diameter of 9 micrometers. A 12 centimeter length of the highly nonlinear fiber 135 was sufficient for spectral generation in the 1050 nanometers wavelength range. The anti-Stokes frequency shifted spectrum measured without filter 138 is shown in FIG. 10. An anti-Stokes pulse spectrum centered at 1048 nanometers with a spectral bandwidth of 30 nanometers was obtained. The average power integrated from 1000-1100 nanometers was around 3 milliwatts. Even with a spectral filter 138 having a 10 nanometer bandwidth, an average output power greater than 900 microwatts was obtained in the wavelength range from 1040-1060 nanometers. This output power is ideal for seeding of a typical Watt-level Yb fiber amplifier, where an average seed power of only 100-300 microwatts is required. Note that a change in pump power from the pump laser 135 did produce changes in the anti-Stokes frequency shifted spectrum; however, these changes were relatively complex and not linearly dependent on pump power. For a tunable laser, it is therefore preferable to fix the pump power from the pump laser 135 and to tune the bandpass filter 138.

Note that an alternative system concept, based on the use of near-bandwidth-limited 600 femtosecond pulses at the input to the 1.5 meter length of negative dispersion Er amplifier 133, also produced an anti-Stokes frequency shifted pulse spectrum near 1050 nanometers. However, when using near bandwidth-limited pulses to the input of the negative dispersion Er amplifier 133, soliton self-frequency shifting in the amplifier 133 cannot be prevented; as a result, the pulse spectrum amplified in amplifier 133 breaks up into Raman-shifted and non-shifted spectral components. The added noise from Raman-shifting as well as from the pulse break-up in amplifier 133 generates additional noise in the anti-Stokes frequency shifted output, making the output near 1050 nanometers essentially unusable.

The following portion of the specification through paragraph [00170] and FIGS. 11-22 and their brief descriptions above are bodily incorporated from parent application Ser. No. 10/608,233.

FIELD OF THE INVENTION

The invention relates to the construction of compact high energy fiber laser pulse sources, methods of designing and using such sources, and adaptive control techniques therefor.

BACKGROUND OF THE INVENTION

Over the last several years, fiber lasers and amplifiers have been regarded as the most promising candidates for pulse sources for industrial applications, due to their unique simplicity of construction. Large core fiber amplifiers and specifically large core diffraction limited multi-mode amplifiers (as described by M. E. Fermann and D. Harter, "Single-Mode Amplifiers and Compressors based on Multi-Mode Optical Fibers", U.S. Pat. No. 5,818,630) enable the amplification of optical signals to levels where micro-machining and laser marking become possible. See A. Galvanauskas et al., U.S. patent application Ser. No. 09/317,221. Since laser marking and micro-machining are dependent on the supply of high peak power pulses, it is advantageous to use such fiber amplifiers for the amplification of nanosecond regime (ns) pulses, as supplied, for example, by micro-chip lasers or general Q-switched sources. In conjunction with large-core fiber amplifiers, these ns pulse sources can be amplified to pulse energies in the hundreds of microjoules (µJ). Such fiber amplifier systems can operate as direct replacements for Nd-based solid state lasers in any micro-machining and marking application.

The use of diffraction limited fiber multi-mode amplifiers allows a significant improvement in power density to be delivered to a target compared to non-diffraction-limited multi-mode amplifiers as described for example in B. Desthieux, Appl. Phys. Lett., vol. 63, No. 5, pp. 586-588 (1993)). Note, that in this early work the use of electrically driven semiconductor lasers for the generation of short optical seed pulses to high power amplifier chains, albeit with a final multi-mode power amplifier, was already described.

The use of electrically driven semiconductor lasers for amplifier chains was later reiterated by Grubb et al., U.S. Pat. No. 6,151,338. A variety of complex fiber amplifier implementations for use in micro-machining applications again reiterating the use of electrically driven semiconductor seed lasers was recently also suggested in U.S. Pat. No. 6,433,306 to Grubb et al. In another suggestion by Grubb et al., U.S. Pat. No. 5,892,615, the use of bent single-mode amplifier fibers has been suggested; the difficulty in making such single-mode amplifiers has also been a limitation in such high power fiber amplifier systems.

The most advanced micro-machining or micro-structuring applications are enabled by amplification of ultrafast optical pulses in fiber media. Ultrafast optical pulses are generally characterized by a pulse width of less than 50 ps; conveniently, chirped pulse amplification is implemented to enable the amplification of such pulses to the µJ-mJ energy range. Generally, chirped pulse amplification systems use a near bandwidth-limited seed pulse source, which is temporally stretched (i.e. chirped) in a pulse stretcher before amplification in a power amplifier. After amplification, the pulses are recompressed to approximately the bandwidth limit using a pulse compressor.

Commercially viable fiber chirped pulse amplification systems were suggested in A. Galvanauskas and M. E. Fermann, 'Optical Pulse Amplification using Chirped Bragg Gratings, U.S. Pat. No. 5,499,134). The system in this work relied on chirped fiber Bragg gratings for pulse stretching. Chirped fiber Bragg gratings have been developed into widely available commercial devices. The chirp imparted by the Bragg gratings can be designed to be linear or nonlinear to compensate for any order of dispersion in a chirped pulse amplification system. See A. Galvanauskas et al., Hybrid Short-Pulse Amplifiers with Phase-Mismatch Compensated Pulse Stretchers and Compressors, U.S. Pat. No. 5,847,863, which is important for the generation of near bandwidth limited pulses after pulse recompression.

Generally, in such systems, as a compromise between system compactness and high-energy capability, the use of a chirped fiber Bragg grating pulse stretcher in conjunction with a bulk grating pulse compressor is advantageous, providing at least partial integration of the high-energy fiber amplifier system. Alternative arrangements resorting to the use of bulk stretchers and compressors (as generally used in the state of the art) are generally much more difficult to align, require a significantly larger amount of space for their operation and are only of limited utility in real industrial applications.

However, to date, the mismatch in the dispersion profile between fiber grating pulse stretchers and bulk grating pulse compressors has limited the compressibility of the pulses, limiting their acceptance in the field of ultrafast optics.

Recently, modular, widely tunable fiber chirped pulse amplification systems were described by M. E. Fermann et al., 'Modular, High Energy Widely Tunable Ultrafast Fiber Source', U.S. patent application Ser. No. 09/576,772, that further enhance the utility of such fiber laser sources in industrial applications.

What remains to be demonstrated is a particularly cost-effective, easily manufacturable and flexible fiber chirped pulse amplification system that is practical for mass production, but yet exhibits high pulse stretching and compression ratios by benefit of matched dispersion profiles.

SUMMARY OF THE INVENTION

The present invention relates to the use of nonlinearly chirped fiber gratings as pulse stretchers in ultra-compact high energy chirped pulse amplification systems. By minimizing the group delay ripple of the fiber gratings and matching their dispersion to the dispersion of bulk grating compressors, accurately dispersion matched pulse stretchers and compressors can be constructed. Very large pulse stretching ratios can thus be implemented in compact chirped pulse amplification systems. Even larger stretching ratios are possible when using concatenated fiber Bragg gratings.

Chirped fiber Bragg gratings can be implemented as pulse stretchers for both solid-state amplifier-based and fiber amplifier-based chirped pulse amplification systems. With regards to fiber chirped pulse amplification, the obtainable pulse energies can be maximized by using polarization maintaining, large-core fiber amplifiers. For ease of alignment, and to help maintain single mode operation, fibers with approximately step-like refractive index profiles and circularly symmetric rare-earth doping profiles are preferred.

Very high average powers can further be obtained by the implementation of double-clad fiber amplifiers. The spectral output of these amplifiers can be optimized by accurate control of the linear polarization state propagating inside the fiber amplifiers.

Adaptive control of the group delay variations in fiber Bragg gratings can further be performed to enable the minimization of group-delay ripple-induced pulse distortions due to chirped fiber Bragg grating imperfections. Adaptive control of the chirp in fiber gratings is enabled by controlling the temperature and/or pressure (stress) inside distinct fiber grating sections. Adaptive control of the group delay variations in chirped fiber gratings can further be used to compensate for self-phase modulation in high energy amplifiers.

The combination of fiber grating pulse stretchers and bulk grating compressors allows the generation of a variety of complex pulse shapes optimized for use in advanced micro-structuring applications.

Finally, fiber grating pulse stretchers can be designed to counteract spectral gain-narrowing in a chirped pulse amplification system, allowing for the generation of pulses with a bandwidth comparable to the gain bandwidth of the optical amplifiers incorporated in the chirped pulse amplification system.

DESCRIPTION OF THE PREFERRED EMBODIMENT

FIG. 11 represents an exemplary embodiment of the invention showing a compact pulse stretcher 1100 as applicable in a generic chirped pulse amplification system. The pulse stretcher uses circulator 1101 to circulate the optical signal from circulator port 1102, via chirped fiber Bragg gratings 1103 and 1104 to port 1105, port 1102 representing the fiber input and port 1105 representing the fiber output. Pulse stretching is obtained in the two concatenated chirped fiber Bragg gratings 1103 and 1104. By adding further circulators to port 1105, a large number of fiber Bragg gratings can be concatenated. By concatenating several chirped fiber gratings, very long stretched pulses can be obtained even with relatively short chirped fiber Bragg gratings. Generally, the length of chirped fiber Bragg gratings is limited to around 10 cm with current manufacturing methods, allowing for maximum stretched pulse widths of about 1 ns, independent of the input pulse width. By concatenating 4 gratings for example, stretched pulse widths up to 4 ns can be obtained, allowing an increase in pulse energy in a chirped pulse amplification system by a factor of 4. Specifically, assuming an input pulse width of 200 fs, a pulse stretching factor of up to 20,000 times can be obtained with a total fiber grating length of 40 cm in a pulse stretcher arrangement. Even larger pulse stretching factors can be implemented in principle, but are not considered practical for industrial laser systems because of the large size (>40-50 cm) and cost of the required compressor grating or gratings.

However, by utilizing multiple grating stretchers, a longer pulse envelope can be generated that can be amplified to higher energies. One means to accomplish this is to have each of the stretcher gratings stretch only a portion of the spectrum of the input pulse. It is possible to coherently add the pulses back to form a single pulse, although it is difficult to maintain phase in such a case. Longer pulse envelopes from such a series of gratings can be recompressed by a series of similar compression gratings. The pulses can be incoherently added. The pulses cannot be recompressed to the same degree as if a single grating is used, although this may be sufficient for many purposes.

The use of stretched pulses with a width of, for example, 4 ns enables the amplification of these pulses to the mJ energy level in large-core (≈30 μm mode diameter) Yb-doped fiber amplifiers. Such high pulse energies are very important for the application of ultrafast fiber laser sources to industrial scale machining applications.

Though in FIG. 11 an implementation of a pulse stretcher using a fiber optical circulator is shown, the optical circulator can be replaced with a simple polarization beam splitter and appropriate waveplates and Faraday rotators to circulate the beam between the 4 optical beam paths. Such optical assemblies are well known in the art and are not separately shown. Another alternative is the use of 3 or 4 port fiber couplers operated in reflection to concatenate several fiber Bragg gratings. The use of fiber couplers leads to an optical loss of at least 6 dB each time a fiber Bragg grating is traversed and is therefore not ideal. Another alternative is the use of a Michelson interferometer constructed from a 4 port fiber coupler; by configuring a 4 port fiber coupler as a Michelson interferometer the 6 dB loss in recirculating through the grating can be avoided.

The preferred application of the pulse stretcher as shown in FIG. 11 is in a chirped pulse amplification system, as exemplified with the optical arrangement 1106 in FIG. 12. The pulse stretcher comprising elements 1108-1112 is configured as in FIG. 11. It is further assumed that a short optical pulse from an appropriate pulse source is injected into circulator port 1109. The pulses from the stretcher 1107 are amplified in amplifier 1113 and partially compressed in fiber compressor 1114, comprising circulator 1115, fiber input 1116, chirped fiber Bragg grating 1117 and fiber output 1118. Final pulse compression is performed in bulk grating compressor 1119 and the output from the system is designated with arrow 1120. Here the orientation of chirped fiber Bragg grating 1117 in partial compressor 1118 is opposite to the orientation of the chirped fiber Bragg gratings in stretcher 1107, i.e. the direction of the grating chirp is reversed. If gratings 1110, 1111 and 1117 are nearly identical, grating 1117 compensates for half of the pulse stretching induced by pulse stretcher 1107. Hence the grating separation in bulk compressor 1119 (i.e. the required optical beam paths) is also reduced by 50% (compared to a system without partial fiber compressor 1117) for optimum pulse compression. Therefore the physical extent of the compressor assembly can also be minimized, which is important in any industrial application. The size of optical assembly 1106 can further be minimized when employing positively chirped fiber stretcher gratings and negatively chirped fiber compressor gratings as well as a bulk grating compressor providing negative dispersion. Here a positively/negatively chirped fiber grating provides the smallest/largest group delay for the longest/shortest optical wavelengths inside the pulse spectrum, respectively.

Moreover, as is well known in the art, in the assembly of negative dispersion bulk gratings compressors, no lenses are required in the dispersive section of the optical beam path (i.e. the optical beam path that provides the wavelength dependent group delay), greatly simplifying its construction.

Bulk compressor 1119 as indicated in FIG. 12 is drawn only schematically, in fact, bulk compressor 1119 represents two transmission gratings operated near the Littrow angle and aligned plane parallel with respect to each other. A single pass through a bulk grating pair 1119 as shown produces temporally compressed pulses with a spatial chirp across the output beam. However, any spatial chirp can be eliminated by simply double-passing the output beam through the bulk grating pair. For ultra-low loss gratings, passing the output beam 4 or even eight times through a bulk grating pair may be considered. Such optical arrangements are well known in the art and are not further discussed here. Equally, plane parallel reflective gratings pairs could be employed in the compressor or a compressor design based on a single transmission/reflection grating with the optical beam path being diffracted by the single grating four times. Equally, bulk optic equivalents of chirped fiber Bragg gratings as discussed in A. Galvanauskas et al, U.S. Pat. No. 5,499,134 can also be implemented as pulse compressors. Such assemblies are also well known in the art and are not further discussed here.

Although, the present example refers to a dual fiber grating stretcher and a single fiber grating partial compressor, any number N of fiber gratings can be used in the stretcher. The number of fiber gratings in the compressor can then be selected between 1 to N, where the residual uncompensated group delay is compensated with a bulk grating compressor. The amplifier 1113 can comprise a fiber, semiconductor or bulk laser amplifier. Alternatively, nonlinear amplifiers such as a Raman or parametric amplifiers can also be implemented, where implementations in both waveguide (fiber) or bulk optical form are acceptable. In conjunction with bulk amplifiers, it is advantageous to implement multiple passes through the amplifier medium or to implement a regenerative optical amplifier. Such optical systems are well known in the art and amplifier 1113 is representative of any such bulk optical amplification system. A plurality of amplifiers can be used. Either the same or different type.

The system shown in FIG. 12 can be further implemented in a compact fiber optic pulse delivery system. Fiber delivery systems have previously been discussed in U.S. Pat. Nos. 5,862,287 and 6,249,630 to Stock et al. and later by Kafka et al. in U.S. Pat. Nos. 6,236,779 and 6,389,198. In the most basic implementation, compressor 1119 is omitted and the dispersion of the fiber grating stretcher/compressor assembly is adjusted to obtain optimally compressed pulses at output 1118. Alternatively, the dispersion inside the fiber grating stretcher/compressor assembly can be adjusted to obtain optimally compressed pulses after propagation of the pulses from output 1118 through a coupled functional end-use system having an additional optical assembly, such as an optical lens assembly or simply a piece of solid glass, in place of or in addition to compressor 1119. Thus, the pulses may be "preconditioned" so as to be delivered in an optimal state after passing through the subsequent optics (of known dispersion characteristics) of an end-use apparatus. Moreover, the output pulses designated by arrow 1120 can be coupled into a low-nonlinearity holey or photonic bandgap pulse delivery fibers; providing for guided propagation via holes surrounding a fiber core or even providing for guided propagation predominantly inside an air-hole as well known in the state of the art. The fiber gratings can thus be implemented to compensate for the dispersion of these fibers to produce the shortest possible pulse at the end of these delivery fibers. Note that the work by Kafka did not provide for any provision to compensate for the dispersion of the photonic bandgap delivery fiber. The holey or photonic bandgap fiber can also be engineered to provide the correct dispersion to be used as pulse compressor or partial pulse compressor for a stretched pulse. Such pulse compressor and partial pulse compressor function of the holey or photonic bandgap fibers can be used in combination with the power delivery function of the same fibers.

To enable re-compression of the stretched pulses obtained from a chirped fiber grating stretcher in a bulk grating compressor, the group delay as a function of wavelength in the chirped fiber Bragg grating assembly has to be matched to the group delay as a function of wavelength generated in the bulk grating compressor. This is performed by balancing the spectral phase of the stretcher/compressor assembly. Generally, the group delay as a function of optical frequency produced by a highly dispersive bulk grating compressor is nonlinear, hence the chirped fiber Bragg grating stretcher needs to be designed with the opposite nonlinear group delay as a function of optical frequency. The nonlinear group delay can also simply be referred to as nonlinear chirp.

Generally, it is very difficult to match the nonlinear chirp produced by the stretcher/compressor assembly perfectly. Due to phase errors in the fiber grating stretcher, in general the fiber grating stretcher will exhibit periodic variations of the group delay from the design curve. The group delay variations produced in a fiber grating can be measured using standard techniques well known in the art. The group delay mismatch between stretcher and compressor can then be measured or calculated (generally, it is sufficient to calculate the group delay produced by a bulk grating compressor; a separate measurement is not necessary) and the results can be fed back to the fabrication process of the fiber grating, i.e. the dc or the ac component in the writing procedure of a fiber Bragg grating can be appropriately modified to reduce the group delay mismatch between fiber grating stretcher and bulk compressor. Through an iterative process very low group delay mismatch between stretcher and compressor can be obtained.

Note that iterative methods to minimize the group delay of chirped fiber gratings have been demonstrated (M. Sumetsky et al., 'Reduction of chirped fiber grating group delay ripple penalty through UV post processing, Conference on Optical Communications, OFC, Atlanta (2003), paper PD28), though to the author's knowledge the iterative method of group delay ripple reduction has not previously been suggested in the construction of high energy chirped pulse amplification systems. As is evident in the article by Sumetsky et al., without iterative group delay ripple reduction, a group delay ripple as large as +−10 ps is generated even in high-quality chirped fiber Bragg gratings. With iterative group delay ripple reduction, the group delay can be reduced to +−2 ps and even smaller values are possible. For pulse compression down to below 1 ps the control of group delay ripple is becoming increasingly significant, in eliminating an unwanted pulse pedestal, which can be detrimental in advanced material processing applications.

Figure 13:
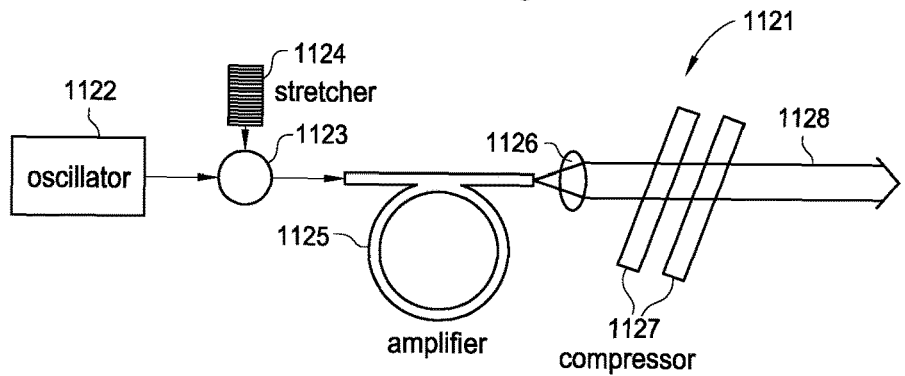
FIG. 13 is a diagram of a generic in-line fiber-based chirped pulse amplification system.

Referring now to FIG. 13, optical assembly 1121 represents an example of a fiber-based chirped pulse amplification system. Short optical pulses from preferably a short pulse fiber oscillator 1122 (as for example described in U.S. Pat. Nos. 5,689,519; 5,450,427; 5,627,848; and 6,072,811 all to Fermann et al.) are injected into circulator 1123 and stretched in nonlinearly chirped fiber Bragg grating 1124.

The stretched pulses are subsequently amplified in fiber amplifier 1125. Fiber amplifier 1125 is preferably based on a double-clad fiber pumped with a high power multi-mode diode laser, though single-clad fiber amplifiers pumped with high power single mode diode lasers can also be implemented. End-pumped or side-pumped amplifier designs can be implemented; as discussed for double-clad fibers in U.S. Pat. No. 5,854,865 to L. Goldberg; U.S. Pat. No. 4,815,079 to E. Snitzer et al.; and U.S. Pat. No. 5,864,644 to DiGiovanni. Such pumping arrangements are well known in the art and not further discussed here. Collimation lens 1126 collimates the amplified pulses emerging from the amplifier and a single or double pass through bulk grating compressor 1127 provides compression down to the bandwidth limit. The direction of the output pulses is exemplified with arrow 1128.

WORKING EXAMPLE 1

Figure 14:
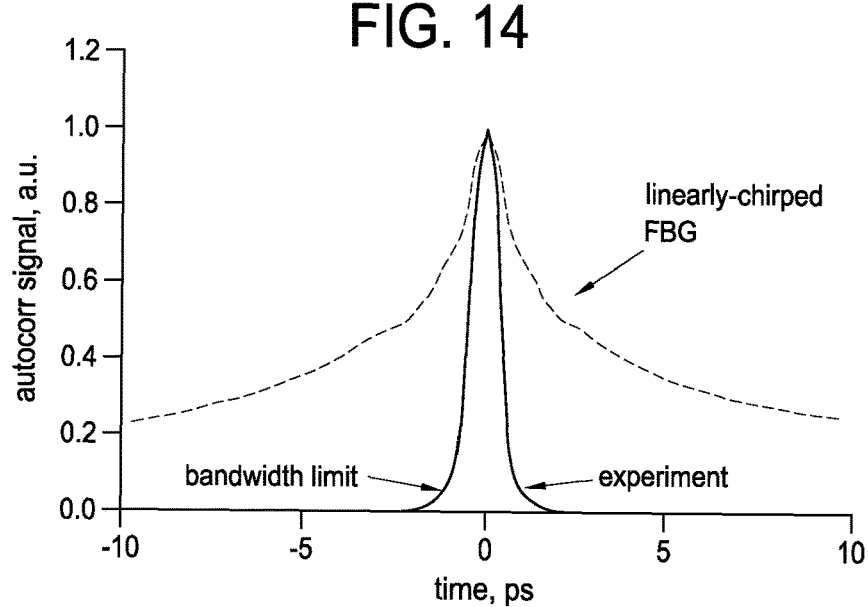
FIG. 14 is an autocorrelation trace obtained with an exemplary fiber-based chirped pulse amplification system.

In a system demonstration, pulses with a full width half maximum (FWHM) width of 350 fs from a passively modelocked Er fiber oscillator operating at a repetition rate of 50 MHz were stretched in a 10 cm long nonlinearly chirped fiber Bragg grating to a width of 700 ps. The nonlinearly chirped fiber grating was designed (e.g., by the iterative method) to provide the same dispersion as the bulk grating compressor; the bulk grating here having a groove spacing of 1200 lines/mm and operated at the Littrow angle. The maximum group delay variations (or group delay ripple) from the designed group delay in the chirped fiber Bragg grating were measured at .+−<2 ps. The oscillator pulse energy was 100 pJ. After amplification by a factor of 10, the pulses were recompressed in the bulk grating compressor. The recompressed pulses had a FWHM width of ≈700 fs sitting on an additional pedestal with a FWHM width of 3 ps, containing about 2% of the pulse energy. Hence a compression ratio of up to 1000 was obtainable with the present arrangement, limited only by the bandwidth of the amplifier. An autocorrelation of the compressed pulses with a 2% pedestal energy content is shown in FIG. 14.

Though the amplified pulse energy in the present system was only 1 nJ, by reducing the repetition rate of the seed source, and the incorporation of additional fiber amplifier stages, much higher pulse energies can be generated. It is therefore instructive to calculate the practical energy limits of the present chirped pulse amplification system. The maximum obtainable pulse energy E can be expressed as $$E = \Phi_{nlmax} \tau_{st} / Y_{eff} L_{eff},$$

where $\Phi_{nlmax}$ is the maximum tolerable nonlinear phase delay (as induced by self-phase modulation) inside the fiber amplifier, $\tau_{st}$ is the FWHM width of the stretched pulses, $Y_{eff}$ is the effective nonlinearity parameter of the fiber and $L_{eff}$ is the effective length of the final fiber power amplifier. For a large mode fiber with a mode diameter of 30 μm (which is generally obtainable with diffraction limited multi-mode fibers as discussed in U.S. Pat. No. 5,818,630) $Y_{eff}$ can be calculated as $Y_{eff} = 2 \times 10^{-4}$/mW at a wavelength of 1550 nm. Highly Er doped silica fibers allow an effective amplifier length shorter than 0.5 m. Moreover, for waveguide amplifiers $\Phi_{nlmax} \approx 10$ can be tolerated without significant pulse distortions. Hence, for a stretched pulse width of $\tau_{st} = 4$ ns, output sub-picosecond pulses with a pulse energy larger than 400 μJ can be safely generated in a large mode fiber with this system.

Regarding size constraints, the bulk compressor could fit into a box with a length of 2 m using 4 passes through a single bulk grating. Using additional optical folding, a compressor size of 1 m could be obtained. Considering that such laser systems would be used in heavy industrial machining (or other applications), located in a large factory hall, a box length of 1 m poses no significant obstacles.

Figure 15:
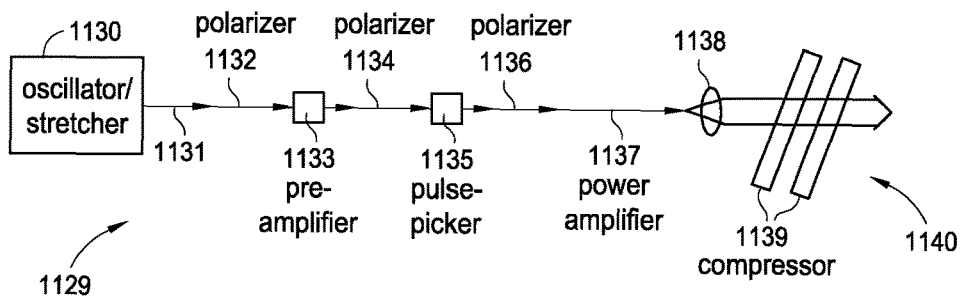
FIG. 15 is a diagram of an in-line fiber-based chirped pulse amplification system with optimized polarization control.

Referring now to FIG. 15, an alternative basic fiber-based chirped pulse amplification system 1129 based on predominantly polarization maintaining (PM) fibers is illustrated. System 1129 comprises an integrated oscillator/fiber grating pulse stretcher assembly 1130, with a PM fiber pig-tail output 1131. A polarizer 1132 (fiber or bulk) is inserted before PM fiber pre-amplifier 1133. A second polarizer 1134 is inserted before pulse picker 1135, which is used to down-count the repetition rate set by the oscillator by a selectable factor, thus providing seed pulses with a reduced repetition rate to the rest of the amplifier system. Another polarizer 1136 is inserted before PM fiber power amplifier 1137. Lens 1138 is used to produce a collimated output from power amplifier 1137. A single or double pass (or quadruple pass) through bulk compressor 1139 provides final pulse compression and the direction of the output pulses is designated with arrow 1140.

PM fibers are preferably constructed using fibers with an internal birefringence $\Delta n$, where $\Delta n > 5 \times 10^{-5}$ and preferably $\Delta n > 1 \times 10^{-4}$. A fiber with a birefringence $\Delta n = 1 \times 10^{-4}$ produces a polarization beat length $l_b$ of $l_b = \lambda/\Delta n = 10$ mm at a wavelength of 1050 nm. When launching a linear polarization state into a birefringence axis of such a fiber, the linear polarization state can be preserved over lengths of several meters with only minimal cross coupling to the orthogonal polarization axis. The leakage to the orthogonal polarization axis can be as small as −40 dB, i.e. the cross coupling to the orthogonal polarization state can be as small as 0.01%.

Assuming now that a linearly polarized pulse is launched with an angular rotational misalignment .alpha. with respect to a polarization axis of the fiber, this polarization axis is excited with a relative intensity of $\cos^2 \alpha$ and the orthogonal fiber polarization axis is excited with a relative intensity of $\sin^2 \alpha$.

Due to group velocity walk off in the PM fiber, at the PM fiber output, two time delayed pulses propagating in the two orthogonal polarization axes are generated with the main pulse having a relative intensity of $\approx 1$ and the leakage pulse having a relative intensity of $\sin^2 \alpha$. The time delay between the pulses is given by $\tau_d \approx L \cdot \Delta n/c$, where L is the fiber length and c is the velocity of light. For a 3 m fiber length and $\Delta n = 1 \times 10^{-4}$, the time delay between the pulses is calculated as $\tau_d = 1$ ps. When a second PM fiber is spliced to the first fiber with an angular misalignment of $\beta$, the leakage pulse couples to the main pulse generating a time delayed pulse in the same polarization state as the main pulse with a relative intensity of $\sin^2 \alpha \cdot \sin^2 \beta$. Assuming $\alpha = \beta$ the leakage pulse has a relative intensity of $\sin^4 \alpha$.

The leakage pulse in turn provides a modulation on the spectral output of the system with a frequency $f = 1/\tau_d$. For a time delay of 1 ps, the modulation frequency corresponds to a sinusoidal perturbation of the optical spectrum of 8 nm. The depth of the spectral perturbation corresponds to $\approx 4 \sin^2 \alpha$; i.e. for a leakage pulse with a relative intensity of 1%, the corresponding relative modulation of the optical spectrum is $\approx 40\%$. The spectral modulation depth is typically further amplified in high gain amplifier systems and can degrade the obtainable pulse quality. When concatenating several sections of polarization maintaining fiber, very large spectral modulations can be obtained in high gain fiber amplifier systems leading to substantial degradation of pulse quality, especially in the presence of self-phase modulation.

To limit the polarization leakage induced spectral modulations in in-line fiber chirped pulse amplification systems it is therefore preferable to minimize the number of polarization maintaining fiber sections and to insert high extinction polarizers or fiber polarizers between sections of polarization maintaining fiber as shown in FIG. 15. These polarizers limit the formation of time delayed leakage pulses propagating in the same polarization direction as the main pulse. If the required pulse quality is not very critical, however, the in-line polarizers can be omitted and a very low-cost and simple design can be obtained.

Figure 16A:
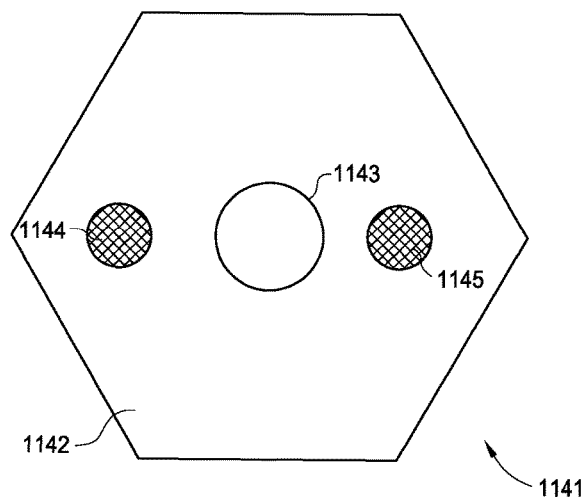
FIG. 16a is a cross section of a polarization maintaining, few-moded, large-core double-clad fiber.
Figure 16B:
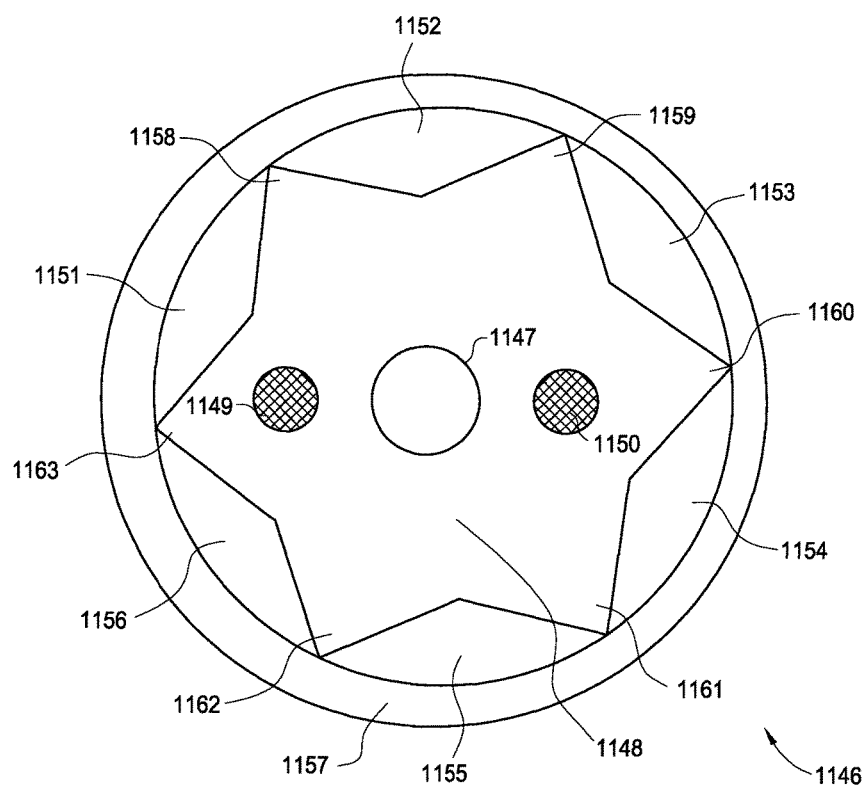
FIG. 16b is a generic cross section of a polarization maintaining, few-moded, large-core air-clad fiber.

Referring now to FIGS. 16a and 16b, two alternative embodiments of PM high power fiber amplifiers are shown. FIG. 16a shows the cross section of a double clad large mode fiber 1141. The fiber comprises a first cladding 1142, a rare-earth-doped core 1143 with a diameter>15 μm and stress producing regions 1144, 1145. To enable pumping with a high power multi-mode semiconductor laser, cladding 1142 is further surrounded with a polymer or glass cladding with a lower refractive index compared to cladding 1142. The second cladding is not separately shown. Additional polymer coating can be applied to the outside of the second cladding. A variety of fiber designs and cladding shapes for PM high power fiber amplifiers are discussed in U.S. patent application Ser. No. 09/809,248 to Fermann et al. and need not be further reiterated here.

A limitation with the fiber design from FIG. 16a is the limited numerical aperture of the cladding, which limits the amount of power that can be coupled into the fiber. A higher cladding numerical aperture can be obtained with an air-clad fiber 1146 as shown in FIG. 16b. Here the fiber core 1147 has preferably a diameter of more than 15 μm. Core 1147 is surrounded by first cladding 1148 containing stress producing regions 1149, 1150 to induce a high amount of birefringence in the fiber to enable PM operation. The first cladding 1148 is in turn surrounded by a second cladding, comprising air-holes 1151-1156. The first cladding is further attached to a third cladding 1157 at bridge points 1158-1163. To maximize the numerical aperture of the air cladding 1151-1156, the bridge points 1158-1163 between first cladding 1148 and third cladding 1157 are made as small as possible. For additional protection third cladding 1157 can further be surrounded by a protective coating; alternatively a gold coating (or other metal coating) can be deposited on third cladding 1157 to enable soldering of the fiber to a heat sink. Any coatings outside third cladding 1157 are not separately shown.

Though a star-shaped air-cladding is shown in FIG. 16b, other forms such as ring segments separated by glass bridges between the first and third cladding are equally possible. Alternatively, closely spaced air-holes located between the first and third cladding can also be implemented. Various cladding shapes for air-clad fibers are well known in the art and are not further discussed here.

The numerical aperture of the cladding of a fiber according to FIG. 16b can be about 50% higher than the numerical aperture of the cladding of a fiber similar to FIG. 16a. Hence for diode pump sources with a given brightness B, more than twice as much power can be coupled into air-clad fibers similar to the type shown in FIG. 16b compared to fibers similar to the design shown in FIG. 16a.

Figure 17A:
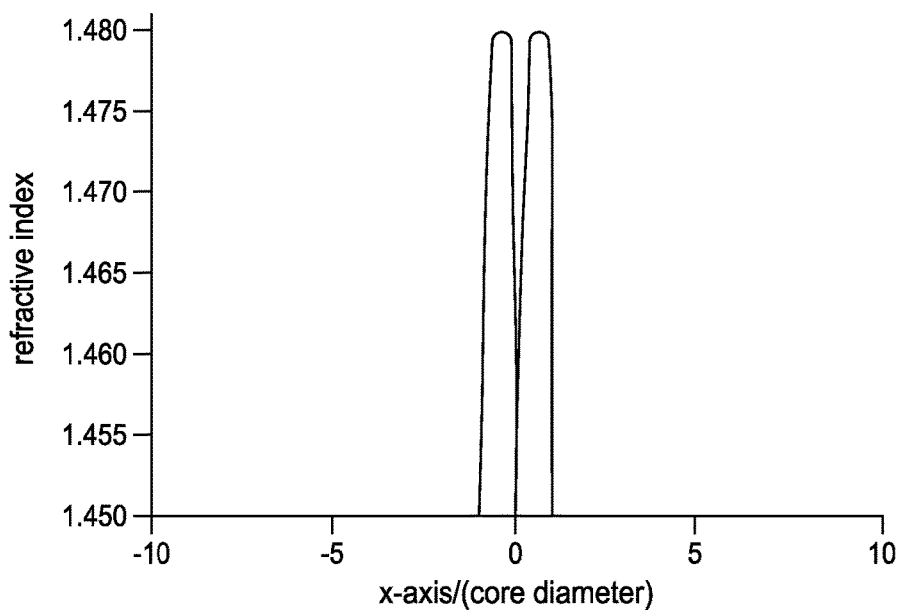
FIG. 17a is a diagram of the refractive index profile of a fiber with a co-axial, central refractive index dip.

Referring now to FIG. 17, some design considerations specific to the large-core MM fiber lasers typically used in the invention will be discussed. In the design of diffraction-limited large-core multi-mode fiber lasers, it is advantageous to use fibers with an approximately step-like refractive index profile as pointed out in U.S. Pat. No. 5,818,630. In contrast, rare-earth-doped fibers made by modified chemical vapor deposition (MCVD) tend to have a co-axial central dip in the refractive index profile as shown in FIG. 17a. In FIG. 17a the values for the refractive index serve only as an example and the exact refractive index depends on the fiber's glass composition. Note that in FIG. 17a only the refractive index for the core region and the immediately adjacent first cladding region are shown.

For fibers as shown in FIG. 17a, the gain may be higher for higher order modes compared to the gain for the fundamental core mode, especially if the rare-earth-ion distribution follows the refractive index profile, at least approximately. Moreover, a dip in the refractive index profile may produce a ring mode as the lowest order mode for the fiber core with reduced focussability compared to a mode with a gaussian intensity distribution.

Figure 17B:
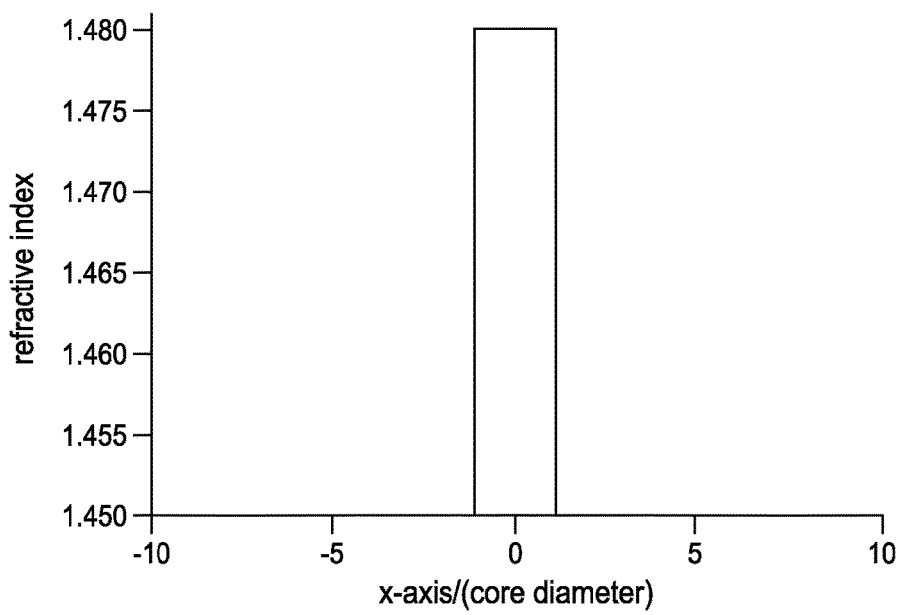
FIG. 17b is a diagram of the refractive index profile of an approximately step-index fiber.

In contrast, a fiber with a step-like refractive index distribution as shown in FIG. 17b is preferable. In practice, a step-like refractive index distribution can be generated by MCVD by increasing the doping level of the index raising dopants in the central core region before preform collapse. In the presence of dopant outgas sing during fiber preform collapse a final refractive index profile as shown in FIG. 17b can be obtained. Alternatively, other fiber manufacturing methods can be implemented where the susceptibility to the generation of a central dip in the refractive index profile is less prevalent; for example outside vapor deposition (OVD) or vapor axial deposition (VAD) may be implemented for this purpose.

Figure 18:
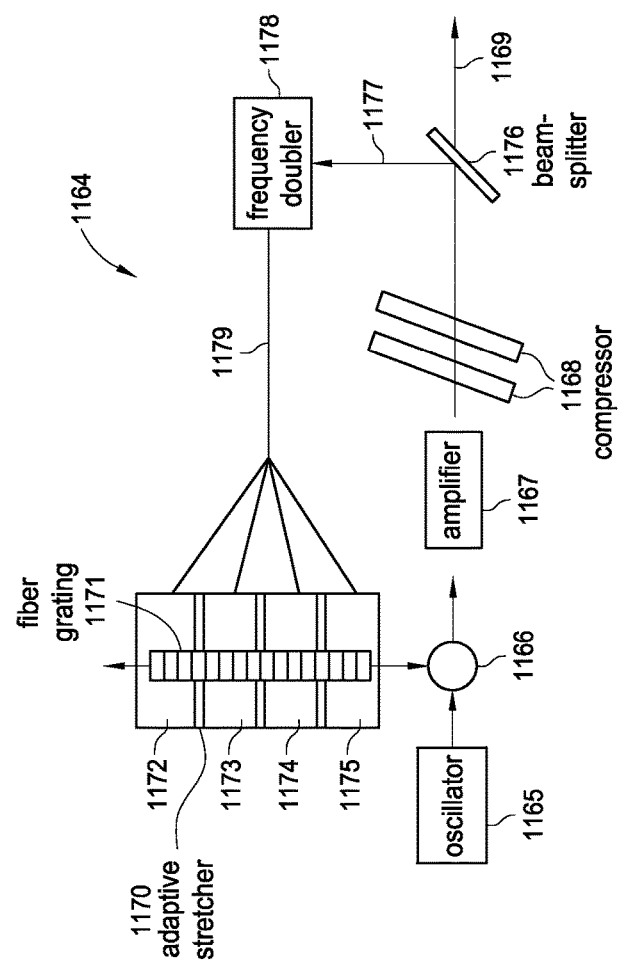
FIG. 18 is a diagram of a scheme for adaptive control of the group delay in fiber gratings in a chirped pulse amplification system.

FIG. 18 illustrates how chirped fiber Bragg gratings can be implemented to adaptively compensate any residual dispersion profile mismatch between a fiber grating stretcher and a bulk grating compressor, greatly improving the fabrication yield of chirped pulse amplification systems. Adaptive pulse compressors are known in the art, but because conventional adaptive compressor systems are based on complex and expensive bulk optics arrangements, they are generally not used in commercial laser systems. In contrast, an integrated and miniaturized fiber-based adaptive pulse stretcher has a great market potential.

Optical assembly 1164 comprises an ultrafast oscillator 1165 emitting short optical pulses. These pulses are injected into optical circulator element 1166. Element 1167 represents an optical amplifier and element 1168 represents a bulk compressor; the output from the system is represented with arrow 1169. Circulator 1166 circulates the oscillator pulses into adaptive pulse stretcher 1170. Adaptive pulse stretcher 1170 comprises a chirped fiber Bragg grating 1171 with an array of selectively electronically addressable segments 1172-1175. While four array elements are illustrated by way of example, any number of segments can be used. Because of the high quality of nonlinearly chirped fiber Bragg gratings, only a limited number of individually addressable fiber Bragg grating sections is required. For a 10 cm long grating, around 100-200 individually addressable fiber grating sections are sufficient. Beam splitter 1176 deflects a small fraction of the optical output beam 1169 generating an optical beam 1177. A frequency-doubler assembly 1178 is then used to provide a feedback signal via electrical control line 1179 to adaptively control the fiber array segments to maximize the doubled output power using general numerical algorithms.

Instead of frequency doubler 1178, other nonlinear pulse characterization devices could be used to provide a feedback signal to the adaptive pulse stretcher. Such pulse characterization devices can comprise auto-correlators or frequency-resolved optical gating devices, just to name two examples.

Not only the peak power, but also the pulse quality of the compressed pulses can thus be directly measured and optimized.

Adaptive control of the chirp inside fiber Bragg grating 1171 is obtained by independently modifying the refractive index in each of the separate fiber sections 1172-1175. Mechanisms for index modification will be described in FIG. 19. Considering that the amount of chirp control possible with an adaptive fiber pulse stretcher 1170 is relatively small, however, one skilled in the art will recognize that the dispersion profile of the fiber Bragg grating pulse stretcher needs to be as closely matched to the dispersion profile of the bulk grating compressor 1168 as possible initially. Residual ripple in the group delay produced by the chirped fiber Bragg grating or any small mismatch between the dispersion profile of the stretcher/compressor assembly can then be adaptively corrected, allowing for the compression of stretched pulses down to near the bandwidth limit.

Figure 19A:
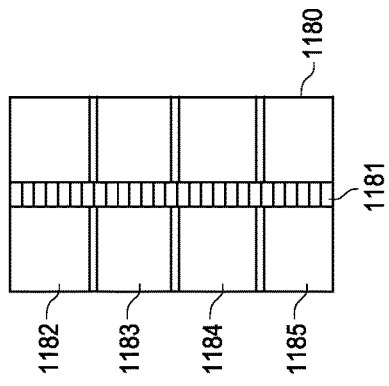
FIG. 19a is a diagram of a scheme for changing the temperature in adjacent sections of chirped fiber gratings for adaptive dispersion control.
Figure 19B:
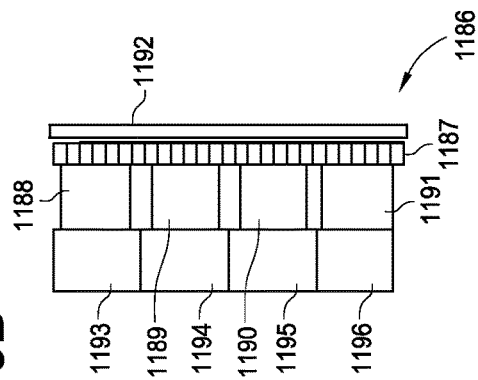
FIG. 19b is a diagram of a scheme for changing the stress in adjacent sections of chirped fiber gratings for adaptive dispersion control.
Figure 19C:
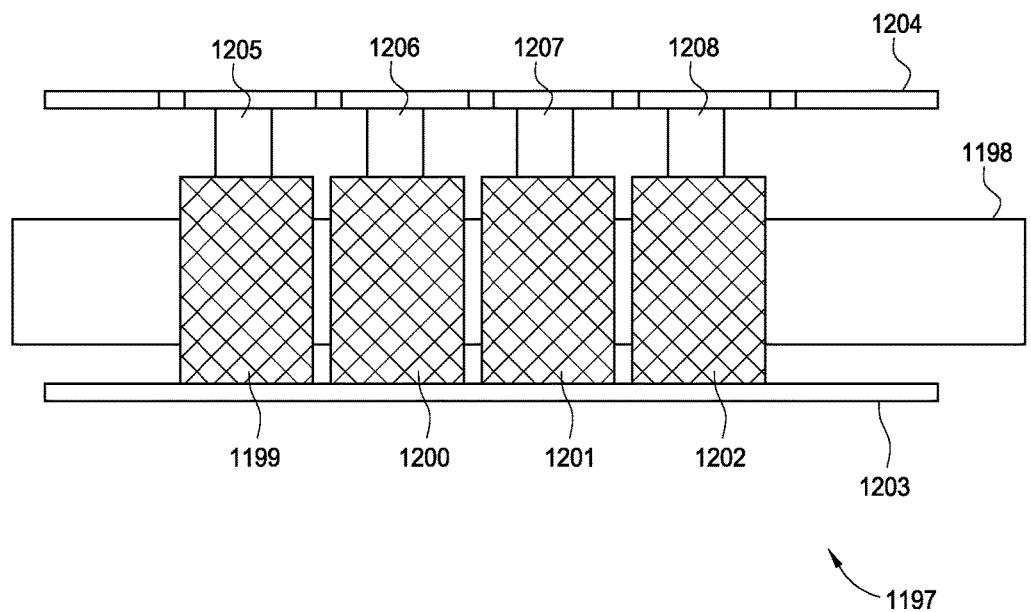
FIG. 19c is a diagram of a scheme for changing the local refractive index in adjacent chirped fiber grating sections by the use of resistive heating.

FIGS. 19a-c demonstrate various methods for modifying the refractive index in separate, individually addressable fiber grating sections. In FIG. 19a adaptive pulse stretcher 1180 contains fiber grating 1181 and allows modification of the refractive index of an array of fiber sections via thermal control. For example fiber Bragg grating 1181 can be attached to an array of thermoelectric heater/cooler elements 1182-1185, which modify the refractive index profile according to the temperature profile applied by heater/cooling elements 1182-1185.

FIG. 19b illustrates an adaptive pulse stretcher system 1186 containing fiber grating 1187. Here piezoelectric elements 1188-1191 are used to produce controllable amounts of strain in adjacent fiber sections by pressing fiber grating 1187 against flat plane 1192. Elements 1188-1191 are attached to holders 1193-1196 to enable packaging of the optical assembly.

FIG. 19c displays yet another alternative embodiment for an adaptive pulse stretcher using resistive heating of sections of a fiber grating. Adaptive pulse stretcher 1197 comprises fiber grating 1198 with a number of metal coated sections 1199-1202. For example a combination of Ni and Au coating is appropriate. The electrically isolated sections can be manufactured by metal coating the whole grating length and then selectively etching away narrow isolating sections 1210. The coating is further attached to common ground 1203. A circuit board-like mask 1204 with electrically conducting, though mutually electrically isolated, sections 1205-1208 is then positioned on top of the metal coated fiber grating sections and arranged such that individually controllable currents can be applied. In the present arrangement the current flows between sections 1199/1205, 1200/1206, 1201/1207 and 1202/1208 respectively. Resistive heating of the metal coating thus heats the individual fiber grating sections, producing proportional refractive index changes in the fiber grating sections as required for adaptive control.

By adaptively controlling the chirp in fiber grating pulse stretchers, large amounts of self-phase modulation can also be compensated. Self-phase modulation generally produces a nonlinear chirp in stretched and amplified pulses which is, to first order, additive to the pulse chirp and not compressible with a conventional stretcher/compressor assembly. However, because the chirp induced by self-phase modulation is additive to first order, it can be pre-compensated in an adaptive pulse stretcher. Indeed, since the amount of induced self-phase modulation depends on the amplified stretched pulse shape, the required fiber grating modification can be estimated from a measurement of the stretched pulse shape and a static (non-adaptive) fiber grating stretcher for self-phase modulation compensation can also be implemented.

Figure 20A:
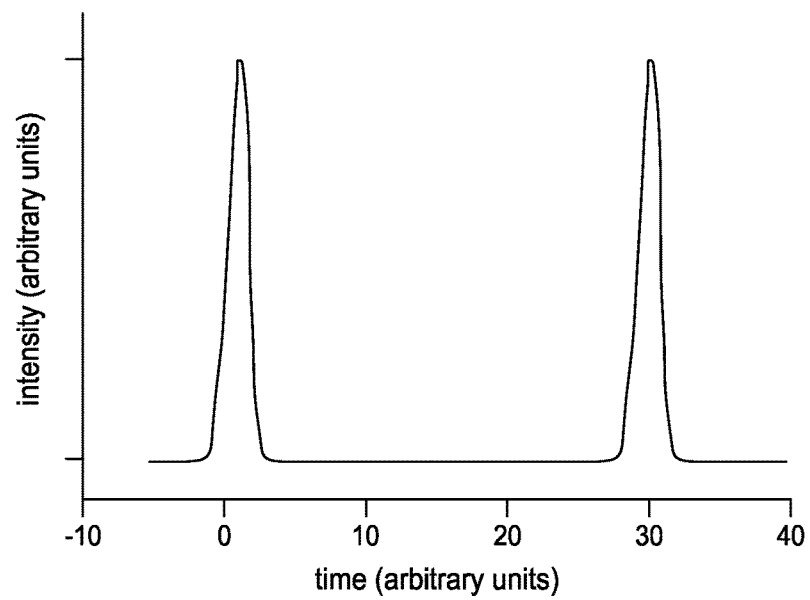
FIG. 20a is a diagram of a pulse train generated with a fiber grating pulse stretcher in conjunction with a bulk grating compressor.
Figure 20B:
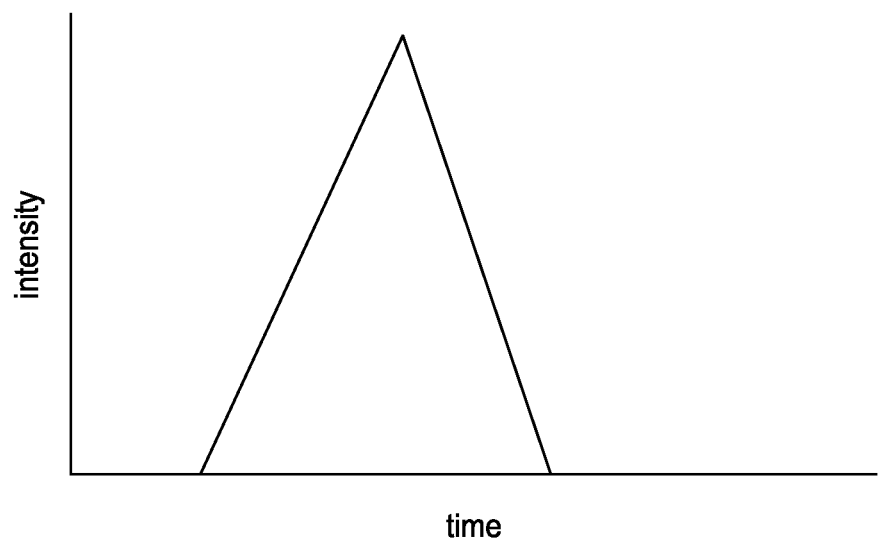
FIG. 20b is a diagram of a triangular pulse generated with a fiber grating pulse stretcher in conjunction with a bulk grating compressor.
Figure 20C:
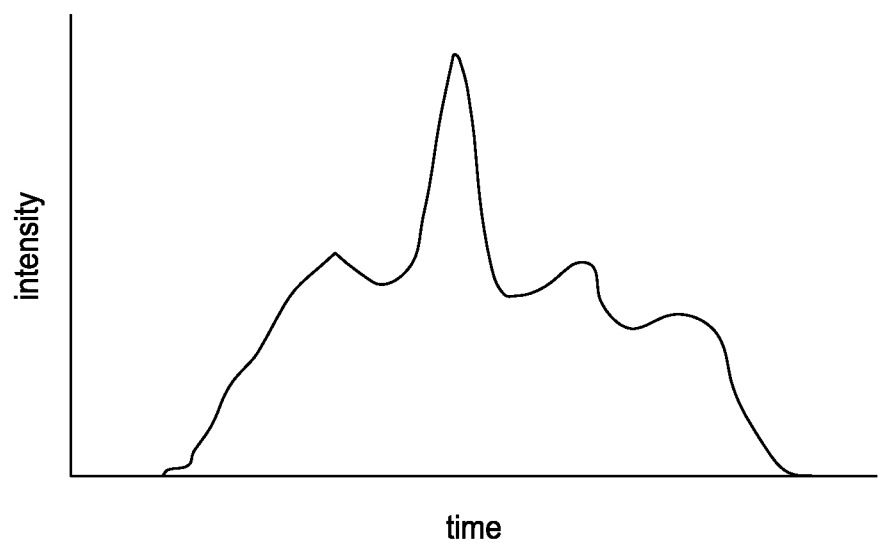
FIG. 20c is a diagram of a general arbitrary pulse form generated with a fiber grating pulse stretcher in conjunction with a bulk grating compressor.
Figure 21:
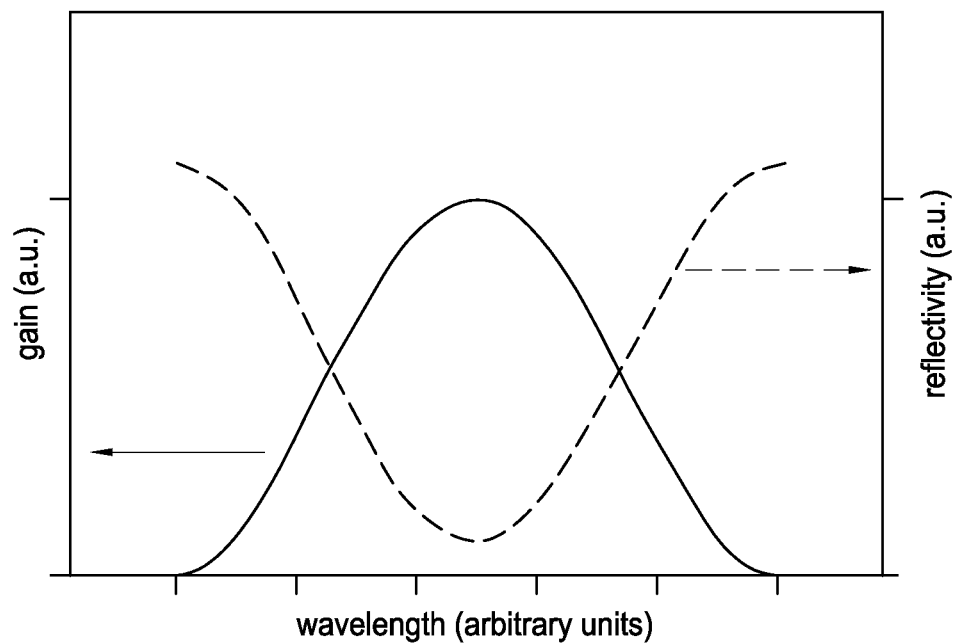
FIG. 21 is a diagram of the spectral reflection profile of a fiber grating pulse stretcher designed to counteract spectral gain-narrowing in a chirped pulse amplification system. The reflection profile is shown in relation to a generic spectral gain-profile of an optical amplifier.

For some machining applications, complex pulse shapes or pulse trains may be required to achieve optimum performance. Chirped fiber Bragg grating stretchers in conjunction with bulk grating compressors can also be implemented as general pulse shaping devices to produce such complex pulse shapes. In this case, fiber Bragg grating designs can be obtained directly from the required output and input pulse shapes using inverse scattering algorithms well known in the state of the art. Fiber Bragg gratings usually have complex continuously varying amplitude and phase structures with discrete phase jumps at various locations along the grating. This type of fiber Bragg grating can usually be written by a continuous write and translate system. For example, as shown in FIG. 20a, by appropriately controlling the phase and the chirp of a fiber Bragg grating, a double-pulse can be generated after compression with a bulk grating compressor. With appropriate fiber Bragg grating designs, the shape of each sub-pulse can be tailored as well as the delay between two pulses. With ten centimeter long fiber Bragg gratings, ns pulse separations can be achieved. This can be further increased if longer fiber Bragg gratings are used. Equally, well defined pulse trains can be generated to be used in micro-machining. Similarly, in FIG. 20b a triangular pulse shape is obtainable from a pulse shaping fiber Bragg grating. Generally, arbitrarily selectable pulse shapes, as shown in FIG. 20c, can be generated from pulse shaping fiber Bragg gratings. If high peak pulse powers are not required, a bulk grating compressor does not need to be implemented and appropriately shaped pulses can be extracted directly after reflection from a fiber Bragg grating.

In short, the above disclosure describes optimized fiber Bragg grating pulse stretchers allowing for 1) precise dispersion control, 2) compensation of self-phase modulation and 3) the generation of optimum pulse shapes for micro-machining and other end uses via a chirped pulse amplification system.

In ultrafast optics applications, the generation of the shortest possible pulses from a chirped pulse amplification system is equally of prime interest. The obtainable pulse widths from chirped pulse amplification systems is limited by gain-narrowing in the amplifiers. Gain narrowing can be counterbalanced by fiber Bragg grating pulse stretchers that exhibit a reduction in reflectivity at the peak of the gain in the amplifier chain as implemented in a generic chirped pulse amplification system. This is further illustrated in FIG. 21. The combination of gain and reflectivity profiles as exemplified in FIG. 21 maximizes the spectral bandwidth of the amplified pulses minimizing the amplified pulse bandwidth. Moreover, whereas in FIG. 21 a relatively simple gain profile is shown, gain narrowing in more complex gain profiles can also be counterbalanced by appropriately designed pulse stretching fiber Bragg gratings. The optimum reflectivity profile is then determined by the largest amplified spectral bandwidth, for a given tolerable level of amplifier noise, i.e. any modulation of the reflection profile of the fiber Bragg grating pulse stretchers produces a reduction in the injected seed pulse energy into the amplifier chain. In practice a seed pulse energy reduction by more than 90-99% cannot be tolerated, because of the onset of significant amplifier noise in the output of the amplifier.

Figure 22:
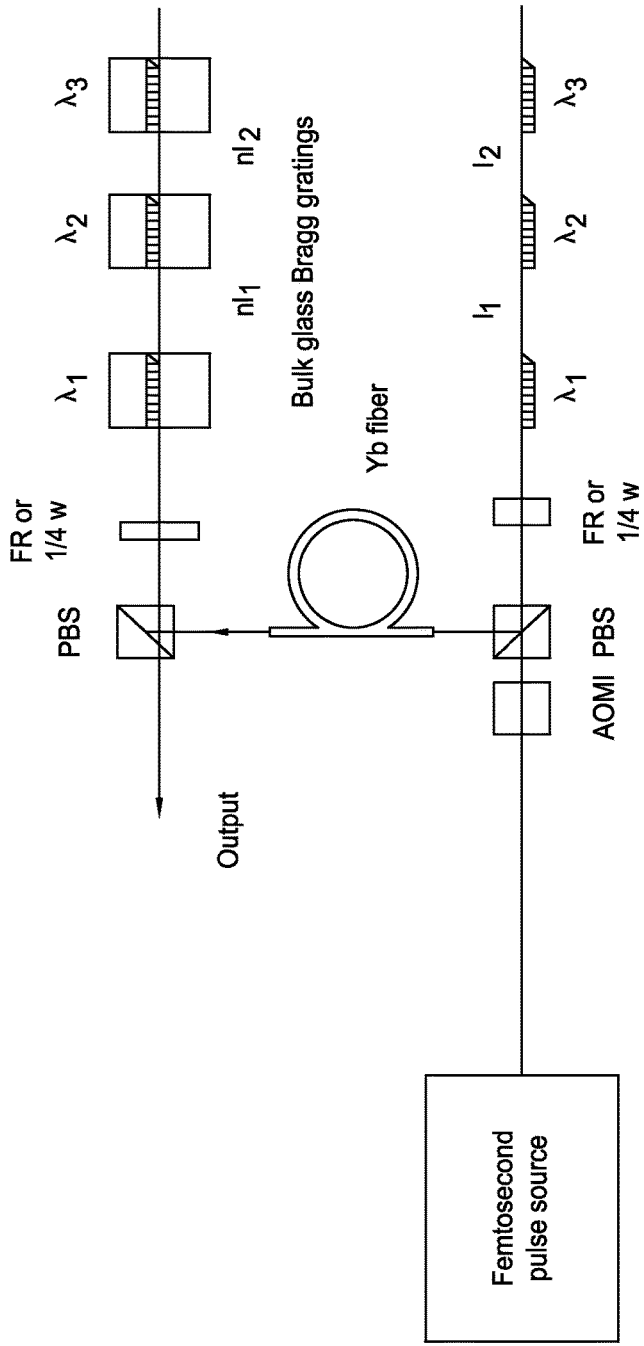
FIG. 22 is a diagram of an embodiment wherein a series of gratings separately stretch different portions of the input pulse spectrum.

A further embodiment shown in FIG. 22 focuses on increasing the possible energy and average power from ultrafast fiber lasers. A longer pulse envelope can be obtained by utilizing a series of chirped gratings that reflect at different wavelengths. After amplification a similar series of gratings can be placed to recombine/compress the pulses. As shown in FIG. 22, pulses from a femtosecond pulse source are passed through an acousto-optic modulator, a polarized beam-splitter and a Faraday rotator, then supplied to a series of chirped fiber stretcher gratings which operate on different portions of the input pulse spectrum. The spacings between the stretcher gratings can be $l_1$, $l_2$, $l_3$ . . . . In order to reconstruct the pulses after amplification in, e.g., a Yb amplifier, the spacings between a series of complementary bulk glass Bragg grating compressors are set to $nl_1$, $nl_2$, $nl_3$, . . . , where n is the refractive index of the fiber between the stretcher fiber gratings, assuming that the bulk Bragg compression gratings are separated by air. The reconstructed pulse is output via a second beam splitter. As previously mentioned, the reconstructed pulse is generally the result of incoherent addition of the separately amplified spectral components of the input pulse.

If the spacings between the compression and stretcher gratings are not equalized as described above, then multiple pulses will appear at the output. This can be beneficial for applications such as micromachining. By varying the stretching and compression ratios pulses with different pulse widths can be combined. A single broadband compression grating can be used if multiple pulses are desired.

This technique can also be used to increase the repetition rate. To increase the repetition rate by n times, n gratings would be used. The separation of these gratings would be equal to the time period between pulses T divided by n times the speed of light.

In this disclosure there are shown and described only the preferred embodiments of the invention and but a few examples of its versatility. It is to be understood that the invention is capable of use in various other combinations and environments and is capable of changes or modifications within the scope of the inventive concept as expressed herein. Further, it should be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. All U.S. patents, publications and applications as mentioned herein are hereby incorporated by reference as if bodily included herein.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A chirped pulse amplification system, comprising:
   a seed pulse source producing short optical pulses;
   a chirped fiber Bragg grating pulse stretcher system (CFBGS) for stretching the pulses;
   a plurality of concatenated sections of predominantly polarization maintaining fiber, at least one which is also an amplifier; and
   at least one chirped fiber Bragg grating compressor,
   wherein said chirped fiber Bragg grating pulse stretcher system (CFBGS) is arranged such that self-phase modulation (SPM) induced in one or more fiber elements of said chirped pulse amplification system is compensated via modification of a dispersion of a fiber grating disposed in said CFBGS.

2. The chirped pulse amplification system as in claim 1, wherein the dispersion inside the CFBGS/fiber grating compressor assembly is adjusted to obtain nearly optimum compressed pulses after propagation of the pulses through a coupled functional end-use system having at least one optical assembly.

3. The chirped pulse amplification system as in claim 1, wherein at least one of said chirped fiber Bragg gratings of said compressor is nonlinearly chirped.

4. The chirped pulse amplification system as in claim 1, further comprising a circulator.

5. The chirped pulse amplification system as in claim 1, wherein dispersion inside the CFBGS is adjusted such that compressed pulses are obtained at a target downstream from said fiber grating pulse compressor, wherein the optical beam-path between said fiber pulse compressor and said target further contains additional optical elements other than air.

6. The chirped pulse amplification system as in claim 1, wherein said beam path between said pulse compressor and a target comprises single-mode fibers.

7. The chirped pulse amplification system as in claim 1, further comprising optical beam delivery fiber(s).

8. The chirped pulse amplification system as in claim 7, wherein said delivery fiber(s) comprise a single-mode fiber, a multi-mode fiber operated with a single-mode output, a holey fiber, a photonic crystal fiber, or a fiber with a guiding air-hole core.

9. The chirped pulse amplification system according to claim 1, wherein said at least one amplifier has a core diameter>15 um.

10. The chirped pulse amplification system as claimed in claim 1, wherein said pulse compressor further comprises a holey or photonic bandgap fiber, wherein the holey or photonic bandgap fiber performs partial pulse compression.

11. The chirped pulse amplification system as claimed in claim 1, further comprising at least one polarizer between sections of predominantly PM fiber.

12. The chirped pulse amplification system as claimed in claim 1, wherein said CFBGS is configured to produce stretched pulses having a group delay ripple less than about 10 ps.

13. The chirped pulse amplification system as claimed in claim 1, wherein said SPM compensation is static (non-adaptive) and a fiber grating dispersion modification is made based on a measurement of pulse quality.

14. The chirped pulse amplification system as claimed in claim 1, wherein said SPM compensation is adaptive and implemented via feedback to a control parameter related to pulse quality.

15. The chirped pulse amplification system as claimed in claim 1, wherein at least a portion of said SPM is induced in said at least one fiber amplifier.

16. The chirped pulse amplification system as claimed in claim 1, wherein said dispersion of a fiber grating is modified by controlling the temperature, pressure, or stress of said fiber grating.

17. A chirped pulse amplification system, comprising:
   a chirped fiber Bragg grating pulse stretcher system (CFBGS), said chirped fiber Bragg grating pulse stretcher system configured to produce stretched pulses;
   at least one amplifier following said stretcher system; and
   a pulse compressor configured to compress said stretched pulses from said amplifier to produce compressed pulses,
   wherein at least a portion of said chirped fiber Bragg grating pulse stretcher system (CFBGS) is arranged such that self-phase modulation (SPM) induced in one or more fiber elements of the chirped pulse amplification system is compensated via modification of a dispersion of a grating disposed in said CFBGS.

18. The chirped pulse amplification system as claimed in claim 17, wherein said chirped pulse amplification system comprises at least one polarization maintaining fiber.

19. The chirped pulse amplification system as claimed in claim 17, wherein said at least one amplifier includes a fiber amplifier constituting one of said fiber elements.

20. The chirped pulse amplification system as claimed in claim 17, wherein said SPM compensation is static (non-adaptive) and a fiber grating dispersion modification is made based on a measurement of pulse quality.

21. The chirped pulse amplification system as claimed in claim 17, wherein said SPM compensation is adaptive and implemented via feedback to a control parameter related to pulse quality.

22. The chirped pulse amplification system as claimed in claim 17, wherein at least a portion of said SPM is induced in said at least one fiber amplifier.

23. The chirped pulse amplification system as claimed in claim 17, wherein said dispersion of a fiber grating is modified by controlling the temperature, pressure, or stress of said fiber grating.

* * * * *